(12) United States Patent
Hisamitsu et al.

(10) Patent No.: US 6,618,103 B2
(45) Date of Patent: Sep. 9, 2003

(54) LIQUID CRYSTAL DISPLAY ELEMENT

(75) Inventors: Akihito Hisamitsu, Osaka (JP);
Nobuyuki Kobayashi, Osaka (JP);
Masako Iwamatsu, Osaka (JP);
Hideaki Ueda, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/846,517

(22) Filed: May 1, 2001

(65) Prior Publication Data

US 2002/0008837 A1 Jan. 24, 2002

(30) Foreign Application Priority Data

May 2, 2000 (JP) ........................ 2000-133830
May 2, 2000 (JP) ........................ 2000-133837

(51) Int. Cl.[7] ........................................... G02F 1/1347
(52) U.S. Cl. ........................................................ 349/78
(58) Field of Search ............................. 428/1.1; 349/78, 349/86, 110; 264/1.36

(56) References Cited

U.S. PATENT DOCUMENTS

| | | | | |
|---|---|---|---|---|
| 5,620,630 A | * | 4/1997 | Onishi | 264/1.36 |
| 5,847,798 A | | 12/1998 | Yang et al. | 349/169 |
| 6,433,843 B1 | * | 8/2002 | Okada | 349/78 |
| 6,461,693 B1 | * | 10/2002 | Iwamatsu | 428/1.1 |

OTHER PUBLICATIONS

J. Kim, N. Leroux and L.–C Chien, "White Reflective Displays from Polymer–Stabilized Cholesteric Textures," SID Digest of Technical Papers, 29, 802–805 (1998).
N. Leroux and L.–C. Chien, "White Reflective Polymer Stabilized Cholesteric Displays," Polym. Mat. Sci. Eng. 72, 285–286 (1995).
R.Q. Ma and D.–K. Yang, "Optimization of Polymer–Stabilized Bistable Black–white Cholesteric Reflective Display," Journal of the SID 7/1, 61–65 (1999).
R.–Q. Ma, D.–K. Yang, "Polymer Stabilized Black–White Cholesteric Reflective Displays," SID Digest of Technical Papers 28, 101–104 (1997).
J.L. West, G.R. Magyar, H. Yoshida, "Recent Advances in Bistable Reflective Cholesteric Displays: Relaxation from Homeotropic Texture in Pulsed Cells," AM–LCD Digest of Technical Papers, 321–324 (1996).
T. Hatano, N. Kobayashi, M. Okada, K. Hashimoto, "Bistable Paper–White Display Device Using Cholesteric Liquid Crystals," SID Digest of Papers, 27, 269–272 (1996).
W.D. St. John, Z.–J. Lu and J.W. Doane, "Surface and Polymer Network Stabilized Reflective Cholesteric Liquid Crystal Displays," Proc. SPIE (1995).
J.L. West, G.R. Magyar, J.J. Francl., "Polymer–Stabilized Cholesteric Texture Materials for Black–on–White Displays," SID Digest of Papers, 25, 608–610 (1994).

* cited by examiner

Primary Examiner—John F. Niebling
Assistant Examiner—Andre C Stevenson
(74) Attorney, Agent, or Firm—Sidley Austin Brown & Wood LLP

(57) ABSTRACT

In liquid crystal display element having cholesteric liquid crystal between substrates, being substantially polymer free, integral value in visible wavelength range of $\{\exp-[2(\lambda-nP)^2/\Delta n^2 P^2]\}R$ is 40–60% of integral value in visible wavelength range of function $f(\lambda)$ representing wavelength-light reflectance spectrum in colored state. In liquid crystal display element having liquid crystal composition between substrates, at least one substrate has functional surface contacting liquid crystal composition, the functional layer being capable of adjusting orientated state of liquid crystal molecules close to substrate and different orientated state of liquid crystal molecules remote from substrate. Chiral nematic liquid crystal, of nematic liquid crystal mixture having refractive index anisotropy of 0.2–0.34 and at least one chiral material, exhibits cholesteric phase at room temperature, has phase transition temperature of 60° C. or higher and positive dielectric constant anisotropy, and wavelength of selectively reflected light is from 480–700 nm.

36 Claims, 6 Drawing Sheets

LIQUID CRYSTAL DISPLAY ELEMENT

This invention is based on patent application Nos. 2000-133830 Pat. and 2000-133837 Pat. filed in Japan, the contents of which are hereby incorporated by reference.

BACKGROUND OF THE INVENTION

1. Field of the Invention

The present invention relates to a liquid crystal display element (i.e., liquid crystal light modulation element) or more particularly to a liquid crystal display element which comprises a liquid crystal exhibiting a cholesteric phase at room temperature and which utilizes switching the liquid crystal to two stable states (bistable switching)

2. Description of the Background Art

In recent years, various researches have been made on liquid crystal display elements comprising a cholesteric liquid crystal such as a chiral nematic liquid crystal which is made to exhibit a cholesteric phase at room temperature by addition of a chiral material to a nematic liquid crystal.

Such liquid crystal display elements may be used, for example, as a liquid crystal display element of the reflection type utilizing the selective reflection of a cholesteric liquid crystal. The liquid crystal display elements of the reflection type may be used in monochrome image display utilizing a whitish color and a black or like background color to provide a substitute for paper or books.

In liquid crystal display elements utilizing the selective reflection of a chiral nematic liquid crystal, the peak of light reflectance of selective reflection in a wavelength-light reflection spectrum in a colored state is centered on a region around selective reflection wavelength. The spectral waveform of the portion is so sharp that when using a liquid crystal display element in a single layer, the obtained display is insufficient and unsatisfactory in that it is high in color purity (i.e., low in whiteness) and shows only a bright color.

In conventional liquid crystal display elements of the reflection type comprising a chiral nematic liquid crystal, for example, when monochrome image display is provided using a black or like background color, good monochrome image display has not been realized in the case of single-layer liquid crystal display elements, and the characteristics such as brightness, contrast and viewing angle dependency in image display are not fully satisfactory. Further, this type of liquid crystal display elements require good temperature compensation characteristics and extension of temperature compensation range.

Polymer stabilized liquid crystal display elements utilizing the selective reflection of a chiral nematic liquid crystal are proposed as a monochrome liquid crystal display element of the reflection type using a cholesteric liquid crystal (e.g., U.S. Pat. No. 5,847,798). In the proposed liquid crystal element, reportedly the reflection spectrum is made so broad in a state of selective reflection that monochrome image display is realized in a single-layer liquid crystal element.

However, in polymer stabilized liquid crystal display elements utilizing the selective reflection of a chiral nematic liquid crystal, a relatively high drive voltage is involved because the liquid crystal contains a network polymer (reticulated polymer), and the background color display characteristic (e.g. black color display characteristic) are insufficient and unsatisfactory in image display. Consequently, the contrast is low.

SUMMARY OF THE INVENTION

An object of the present invention is to provide a liquid crystal display element comprising a cholesteric liquid crystal such as a chiral nematic liquid crystal exhibiting a cholesteric phase, the display element being excellent in bistability, and capable of providing image display which is bright and high in visibility, so that in providing monochrome image display using a black or like background color, the characteristics such as sharp contrast, brightness and the like can be obtained.

Another object of the invention is to provide a liquid crystal display element comprising a cholesteric liquid crystal and enabling application of a low drive voltage.

A further object of the invention is to provide a liquid crystal display element comprising a chiral nematic liquid crystal and assuring a wide temperature compensation range.

The present inventors conducted extensive research to achieve the foregoing objects and found the following.

The liquid crystal display element proposed by the present inventors has a liquid crystal layer containing a cholesteric liquid crystal and held between a pair of substrates, the cholesteric liquid crystal being substantially free of a polymer. The proposed liquid crystal display element is capable of switching the liquid crystal to a colored state or to a scattering state by application of a specified voltage to provide image display. When the peak of selective reflection of the cholesteric liquid crystal is broad, in other words, when the peak of light reflectance of selective reflection in a wavelength-light reflection spectrum in a colored state is broad (extended to a wider visible wavelength range), good monochrome image display is realized using a whitish color and a black or like background color in a single-layer liquid crystal display element.

When generally a liquid crystal exhibiting a cholesteric phase is in a planar state wherein the helical axes of liquid crystal molecules are perpendicular to the substrate, the liquid crystal selectively reflects the light of a wavelength corresponding to a product of a helical pitch and an average refractive index of the liquid crystal. Accordingly, the liquid crystal would show, for example, a red, blue or green color if the liquid crystal has a selective reflection wavelength which corresponds to a red, blue or green wavelength range. By setting the liquid crystal, e.g. to an incompletely planar state, the peak of light reflectance of selective reflection can be made broad as peaks randomly occur due to a reflection direction of each domain (region).

According to the present inventors' research, the following advantages are given to a liquid crystal display element having a liquid crystal layer containing a cholesteric liquid crystal between a pair of substrates, the cholesteric liquid crystal being substantially free of a polymer and being capable of switching to a colored state or to a scattering state by application of a specified voltage to provide image display.

When the peak of light reflectance of selective reflection in a wavelength-light reflectance spectrum in a colored state is broad and when an integral value in a visible wavelength range of a formula $$\{\exp[-2(\lambda-nP)^2/\Delta n^2 P^2]\}R$$

that is expressed as a function of wavelength $\lambda$ is in a range from about 40% to about 60% of an integral value in the visible wavelength range of a function $f(\lambda)$ that represents a spectral reflectance in the colored state, wherein n is an average refractive index of the cholesteric liquid crystal, P is a helical pitch of the cholesteric liquid crystal, R is a light reflectance in a selective reflection wavelength nP of the cholesteric liquid crystal in the colored state and Δn is a refractive index anisotropy of the cholesteric liquid crystal, image display is realized with a low color purity (i.e. high in whiteness) and is bright and excellent in visibility. For example, when monochrome image display is provided using a black or like background color, sharp contrast, brightness and like characteristics can be obtained. Further, the resulting display element is excellent in bistability and can be driven by application of a relatively low voltage.

The foregoing formula $$\{\exp-[2(\lambda-nP)^2/\Delta n^2 P^2]\}R$$

represents a normal distribution function wherein R is a light reflectance in a central wavelength (selective reflection wavelength nP) and $(\Delta nP/2)^2$ is variance.

When an integral value in a visible wavelength range of the formula $$\{\exp-[2(\lambda-nP)^2/\Delta n^2 P^2]\}R$$

is more than 60% of an integral value in a visible wavelength region of a function f (λ) representing a wavelength-light reflectance spectrum in a colored state, it is difficult to provide broad peak of light reflectance of selective reflection or in other words, the spectral waveform of peak portion of light reflectance becomes sharp, and image display tends to exhibit a high color purity and to show a brilliant color. On the other hand, if the integral value ratio is less than 40%, it is difficult to bring about the peak of light reflectance of selective reflection in a wavelength range of high luminous reflectance, e.g. a wavelength range in the range of about 500 nm to about 800 nm, resulting in a tendency of imparting low visibility. Consequently in any case of more than 60% or less than 40%, image display is low in visibility.

The present invention provides a first liquid crystal display element based on the above-mentioned novel findings.

(1) First Liquid Crystal Display Element

The present invention provides a first liquid crystal display element which comprises a pair of substrates at least one of which transmits light and a liquid crystal layer containing a cholesteric liquid crystal and held between the pair of substrates, the cholesteric liquid crystal being substantially free of a polymer (free of a polymer other than the liquid crystal), the display element being capable of switching the liquid crystal to a colored state or to a scattering state by application of a specified voltage (i.e. switching the liquid crystal to a colored state or to a scattering state in each pixel region) to provide image display, wherein an integral value in a visible wavelength range of the formula (expressed as a function of wavelength λ)

$$\{\exp-[2(\lambda-nP)^2/\Delta n^2 P^2]\}R$$

(wherein n is an average refractive index of the cholesteric liquid crystal, P is a helical pitch of the cholesteric liquid crystal, R is a light reflectance in the selective reflection wavelength nP of the cholesteric liquid crystal and Δn is a refractive index anisotropy of the cholesteric liquid crystal) is about 40% to about 60% of an integral value in a visible wavelength range of a function f (λ) representing a wavelength-light reflectance spectrum in the colored state.

The inventor also found the following.

The following advantages are given to a liquid crystal display element which has a liquid crystal layer containing a chiral nematic liquid crystal and held between a pair of opposed substrates, the chiral nematic liquid crystal exhibiting a cholesteric phase. When the peak of light reflectance of selective reflection of the liquid crystal is broad (extended to a wider visible wavelength range), good monochrome image display is realized using a black or like background color in a single-layer liquid crystal display element.

As described above, when usually a liquid crystal exhibiting a cholesteric phase is in a planar state wherein the helical axes of liquid crystal molecules are perpendicular to a substrate, the liquid crystal selectively reflects the light of a wavelength corresponding to a product of a helical pitch and an average refractive index of the liquid crystal. Accordingly, the liquid crystal would show, for example, a red, blue or green color if the liquid crystal has a selective reflection wavelength corresponding to a red, blue or green wavelength range.

When the liquid crystal is interposed between a pair of substrates having a functional surface which is capable of adjusting an orientated state of liquid crystal molecules in the liquid crystal composition close to the substrate and an orientated state of liquid crystal molecules in the liquid crystal composition remote from the substrate to make the former orientated state different from the latter, the liquid crystal is set to an incompletely planar state, and thereby the peak of light reflectance of selective reflection can be rendered broad as peaks randomly occur due to a reflection direction of each domain (region).

According to the present inventors' research, the following advantages are given to a liquid crystal display element which has a liquid crystal layer containing a liquid crystal composition and held between a pair of opposed substrates, wherein at least one of the substrates has a functional surface in contact with the liquid crystal composition which surface is capable of adjusting an orientated state of liquid crystal molecules in the liquid crystal composition close to the substrate and an orientated state of liquid crystal molecules in the liquid crystal composition remote from the substrate to make the former orientated state different from the latter. The liquid crystal composition is a chiral nematic liquid crystal exhibiting a cholesteric phase at room temperature. The chiral nematic liquid crystal comprises a nematic liquid crystal mixture of high refractive index (refractive index anisotropy 0.2 to 0.34) and at least one species of chiral materials added to the mixture (or at least one species of chiral materials added to the mixture for adjustment of selective reflection wavelength to a visible wavelength range). The liquid crystal composition has a phase transition temperature (temperature for transition from a cholesteric phase to an isotropic phase) $T_{ch-I}$ of 60° C. or higher and shows a positive dielectric constant anisotropy so that the liquid crystal can be set to an incompletely planar state and the peak of light reflectance of selective reflection can be made broad. That is, the wavelength range of selectively reflected light covers the entire range in the range of 480 nm to 700 nm. Accordingly, image display is realized with low color purity (i.e. high in whiteness) and is bright and excellent in visibility. For example, when monochrome image display is provided using a background color such as black color, sharp contrast, brightness and like characteristics can be obtained. The resulting display element is excellent in bistability, and assures a wide temperature compensation range. The amount of the chiral material to be used is equal to an amount effective for forming a focal conic structure of the liquid crystal and a planar structure thereof.

The present invention provides the following second and third liquid crystal display elements based on the above-mentioned novel findings.

(2) Second Liquid Crystal Display Element

The second liquid crystal display element comprises a pair of opposed substrates and a liquid crystal layer containing a liquid crystal composition and held between the pair of substrates, at least one of the paired substrates having a functional surface in contact with the liquid crystal composition, the functional surface being capable of adjusting an orientated state of liquid crystal molecules in the liquid crystal composition close to the substrate and an orientated state of liquid crystal molecules in the liquid crystal composition remote from the substrate to make the former orientated state different from the latter. The liquid crystal composition is a chiral nematic liquid crystal exhibiting a cholesteric phase at room temperature and comprising a nematic liquid crystal mixture of refractive index anisotropy 0.2 to 0.34 and at least one species of chiral materials added to the mixture. The chiral nematic liquid crystal has a phase transition temperature of 60° C. or higher and shows a positive dielectric constant anisotropy. The wavelength range of selectively reflected light in the liquid crystal layer covers the entire range in a range of 480 nm to 700 nm.

(3) Third Liquid Crystal Display Element

The third liquid crystal display element comprises a pair of substrates and a liquid crystal layer containing a liquid crystal composition and held between the pair of substrates, at least one of the paired substrates having a functional surface in contact with the liquid crystal composition, the functional surface being capable of adjusting an orientated state of liquid crystal molecules in the liquid crystal composition close to the substrate and an orientated state of liquid crystal molecules in the liquid crystal composition remote from the substrate to make the former orientated state different from the latter. The liquid crystal composition is a chiral nematic liquid crystal exhibiting a cholesteric phase at room temperature and comprising a nematic liquid crystal mixture of refractive index anisotropy 0.2 to 0.34 and at least one species of chiral materials added to the mixture for adjustment of selective reflection wavelength to a visible wavelength range. The chiral nematic liquid crystal has a phase transition temperature of 60° C. or higher and shows a positive dielectric constant anisotropy. The wavelength range of selectively reflected light in the liquid crystal layer covers the entire range in a range of 480 nm to 700 nm.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1(A) is a view showing a focal conic state, i.e. a scattering state (transparent state, more specifically, black display state) when a low pulse voltage from a pulse power source is applied across the liquid crystal display element. FIG. 1(B) is a view showing a planar state, i.e. a colored state (white display state) when a high pulse voltage from the pulse power source is applied across the liquid crystal display element.

$$\{\exp[-2(\lambda-nP)^2/\Delta n^2 P^2]\}R$$

(wherein nP is a selective reflection wavelength of the cholesteric liquid crystal, R is a light reflectance in the selective reflection wavelength nP and $\Delta n$ is a refractive index anisotropy of the cholesteric liquid crystal).

Figure 5A:
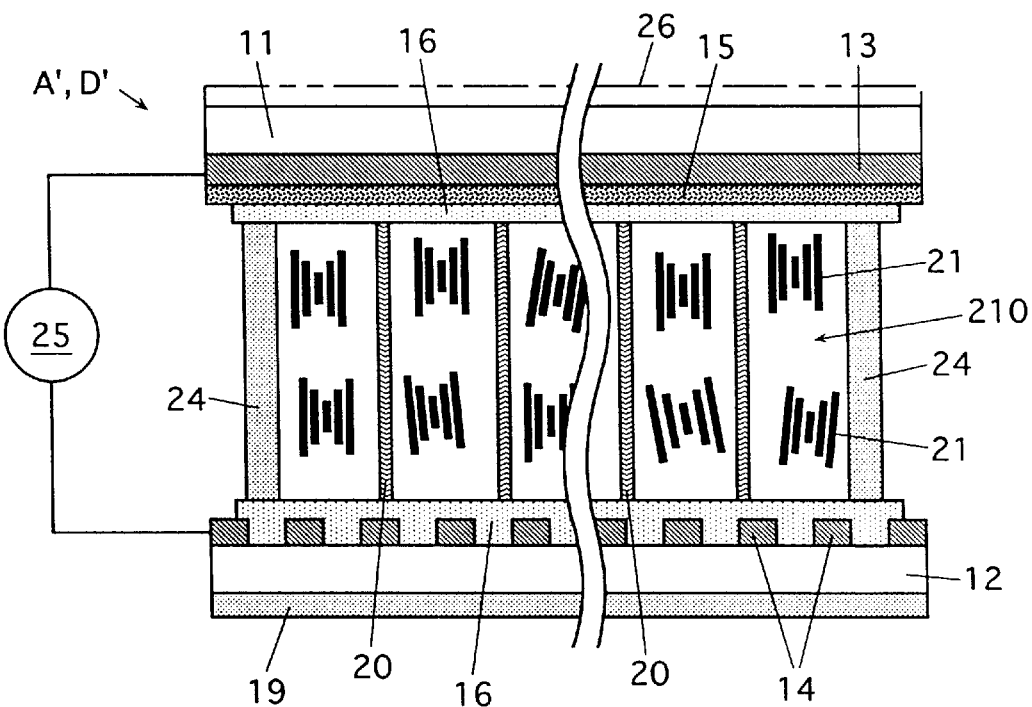
Figure 5B:
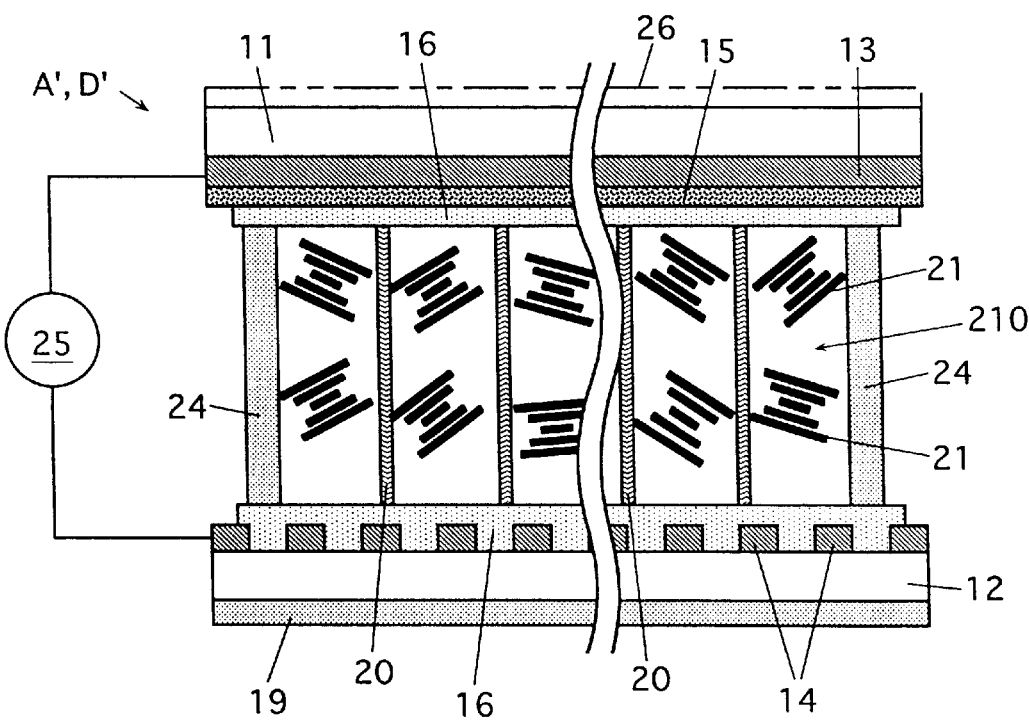

FIG. 5(A) and FIG. 5(B) schematically show internal structures of liquid crystal display elements according to the 5th and 8th embodiments of the invention. FIG. 5(A) is a view showing a focal conic state (transparent state, more specifically, black display state) when a low pulse voltage from a pulse power source is applied across the liquid crystal display element. FIG. 5(B) is a view showing a planar state (white display state) when a high pulse voltage from the pulse power source is applied across the liquid crystal display element.

Figure 6:
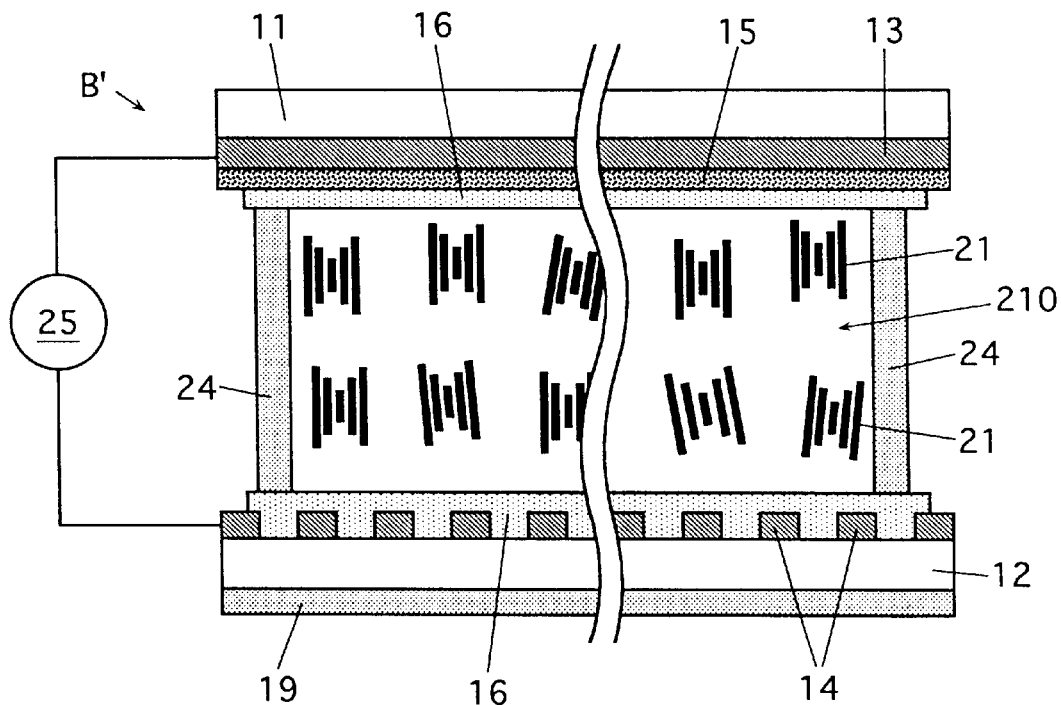

FIG. 6 schematically shows an internal structure of a liquid crystal display element according to the 6th embodiment of the invention, and is a view showing a focal conic state when a low pulse voltage from a pulse power source is applied across the liquid crystal display element.

Figure 7:
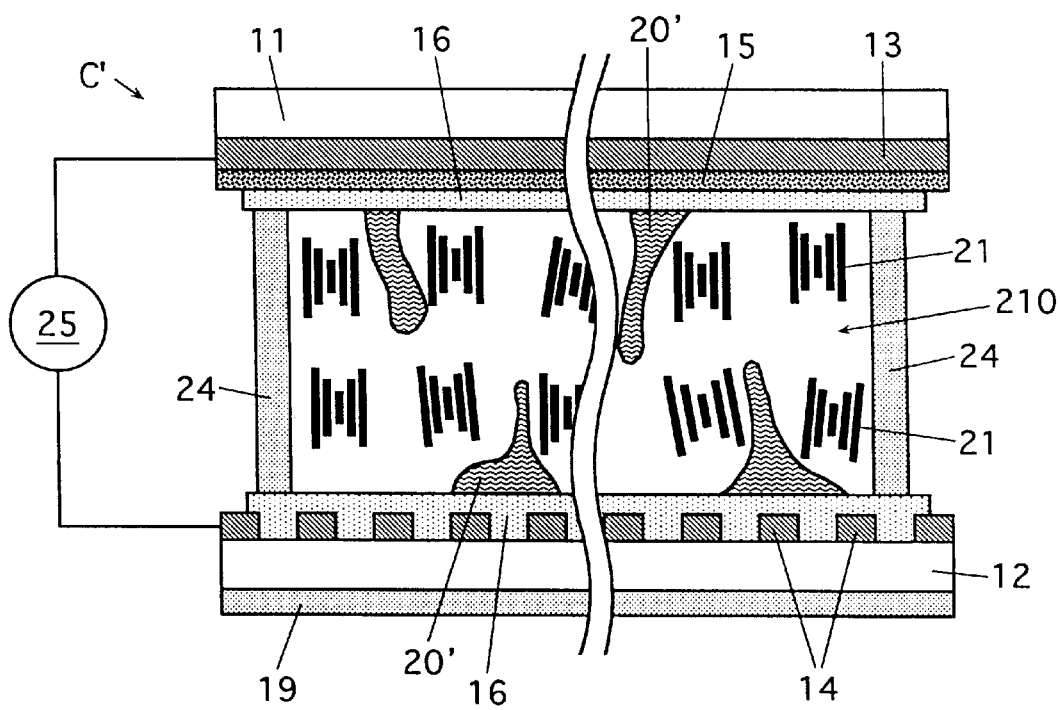

FIG. 7 schematically shows an internal structure of a liquid crystal display element according to the 7th embodiment of the invention, and is a view showing a focal conic state when a low pulse voltage from a pulse power source is applied across the liquid crystal display element.

Figure 8:
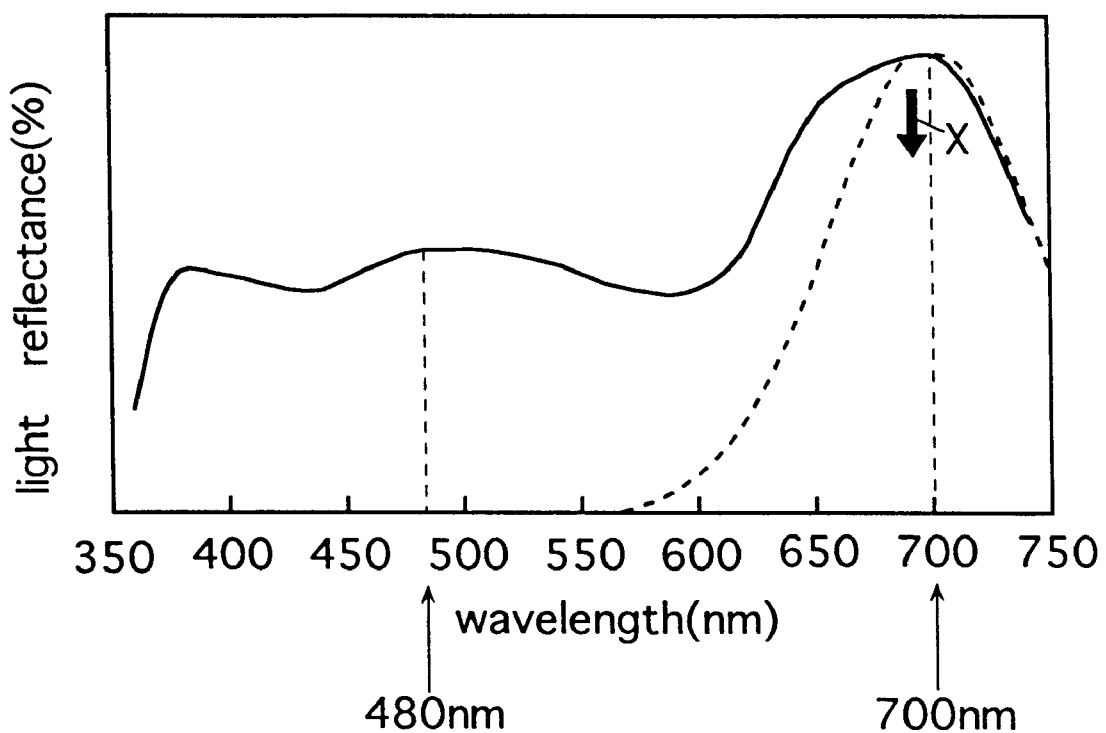

FIG. 8 shows an example of the wavelength-light reflectance spectrum of the liquid crystal display elements shown in FIG. 5(A), FIG. 5(B), and FIGS. 6 and 7.

DESCRIPTION OF THE PREFERRED EMBODIMENTS

[1] Embodiments Relating to the Above-mentioned First Type Liquid Crystal Display Element According to the Invention The liquid crystal display elements in accordance of any embodiments of the invention to be described herein basically comprise a pair of substrates at least one of which transmits light and a liquid crystal layer containing a cholesteric liquid crystal and held between the pair of substrates, the cholesteric liquid crystal being substantially free of a polymer (free of a polymer other than a liquid crystal), the display element being capable of switching the liquid crystal to a colored state or to a scattering state by application of a specified voltage (i.e. switching the liquid crystal to a colored state or to a scattering state in each pixel region) to provide image display.

An integral value in a visible wavelength range of the formula (represented as the function of wavelength $\lambda$)

$$\{\exp[-2(\lambda-nP)^2/\Delta n^2 P^2]\}R$$

wherein R is a light reflectance in a selective reflection wavelength nP (n is an average refractive index of the cholesteric liquid crystal, and P is a helical pitch of the cholesteric liquid crystal) of the cholesteric liquid crystal in a colored state and $\Delta n$ is a refractive index anisotropy of the cholesteric liquid crystal is in the range of about 40% to about 60% of an integral value in the visible wavelength range of a function f ($\lambda$) representing a wavelength-light reflectance spectrum in the colored state.

The foregoing liquid crystal display element can be used as the liquid crystal display element of the reflection type utilizing the selective reflection of a cholesteric liquid crystal. In this case, monochrome image display is provided using a background color such as black color.

Since the integral value in the visible wavelength range of the formula $$\{\exp[-2(\lambda-nP)^2/\Delta n^2 P^2]\}R$$

is about 40% to about 60% of the integral value in the visible wavelength range of the function f ($\lambda$) representing a wavelength-light reflectance spectrum in the colored state according to the liquid crystal display element, the peak of light reflectance of selective reflection can be made properly broad, and the obtained image display is low in color purity (i.e. high in whiteness) in a colored state and is bright and excellent in visibility. For example, when monochrome image display is provided using a background color such as black color, sharp contrast, brightness and like characteristics can be obtained. The first type display element is excellent in bistability, and a low drive voltage can be applied. Consequently, this type of display element is advantageous in drive voltage and display characteristics compared with conventional polymer stabilized liquid crystal display elements. Good monochrome image display can be realized with this type liquid crystal display element in a single layer so that the display element can be used for manufacturing monochrome liquid crystal display panels at low costs.

Generally there are different views on a range of visible wavelength range, so that the established ranges may be a little varied in these liquid crystal display elements. Even when the established range of visible wavelength range is indefinite, the ranges would be acceptable if the ranges are varied within a generally acceptable range of the visible wavelength range. Regardless of this tendency, when the integral value in a visible wavelength range of the formula (represented as the function of wavelength $\lambda$)

$$\{\exp[-2(\lambda-nP)^2/\Delta n^2 P^2]\}R$$

is in a range of about 40% to about 60% of the integral value in the visible wavelength range of the function f ($\lambda$) representing a wavelength-light reflectance spectrum in the colored state, image display is realized with a low color purity and is bright and excellent in visibility. In Examples to be described later, the visible wavelength range is in a range of 360 nm to 740 nm.

The selective reflection wavelength nP of the cholesteric liquid crystal in said liquid crystal layer may be in a range of e.g., 500 nm to about 800 nm in which a luminous reflectance is high, although not limited thereto.

To make broad the peak of light reflectance of selective reflection in a wavelength-light reflectance spectrum in a colored state, it is desirable that the refractive index anisotropy $\Delta n$ of the cholesteric liquid crystal in said liquid crystal layer is relatively high. The refractive index anisotropy $\Delta n$ is, for example, in a range of about 0.18 to about 0.32.

The liquid crystal layer may contain a dye. Useful dyes are, for example, UV absorbing dyes, dyes for adjustment of color and the like, and include dyes having a maximum absorption of light of a wavelength around selective reflection wavelength nP and the vicinity thereof and/or selective reflection wavelength nP×0.7 (0.7 times of selective reflection wavelength nP). When the liquid crystal layer contains a dye having a maximum absorption of light of a wavelength around selective reflection wavelength nP and/or selective reflection wavelength nP×0.7, it is easy to provide broad peak of light reflectance of selective reflection in a wavelength-light reflectance spectrum in a colored state.

In any case, the liquid crystal layer contains preferably a cholesteric liquid crystal exhibiting a cholesteric phase at room temperature. Typical examples include chiral nematic liquid crystals prepared by mixing a nematic liquid crystal mixture with at least one species of chiral materials. A preferred content of the chiral material is about 10 wt % to about 45 wt %. It is desirable to incorporate a nematic liquid crystal material of refractive index anisotropy of about 0.2 to about 0.32 into the chiral nematic liquid crystal.

At any rate, the cholesteric liquid crystal present in the liquid crystal layer has preferably a phase transition point $T_{ch-I}$ (phase transition temperature) from a cholesteric phase to an isotropic phase in a range of, e.g. about 60° C. to about 120° C. Preferably the temperature compensation range is in such a range that the waveform of a wavelength-light reflectance spectrum in a visible wavelength range is scarcely varied (e.g. selective reflection wavelength is scarcely shifted) when the liquid crystal display element has a temperature in the range of room temperature to 60° C. For example, in measured values of wavelength at which light reflectance reaches a peak in around selective reflection wavelength nP, preferably there is a difference of 30 nm or less than 30 nm between a measured value at a liquid crystal display element temperature of 25° C. and a measured value at a liquid crystal display element temperature of 60° C.

In any case, even after stopping the application of a voltage, desirably the region in a colored state and the region in a scattering state are kept in the colored state and in the scattering state, respectively.

At any rate, optionally a color filter may be provided to adjust the color tone. A plurality of structures made of mainly a polymeric material (structures made of a resin or like polymer or structures made of a polymeric composition such as a resin composition) may be provided between the paired substrates to maintain a spacing between the two substrates and/or to increase the strength of a display element. An UV (ultraviolet rays) protective filter may be provided in one of the paired substrates.

Next, examples of the liquid crystal display element of the above-mentioned type are described with reference to FIGS. 1(A) to FIG. 4.

Figure 1A:
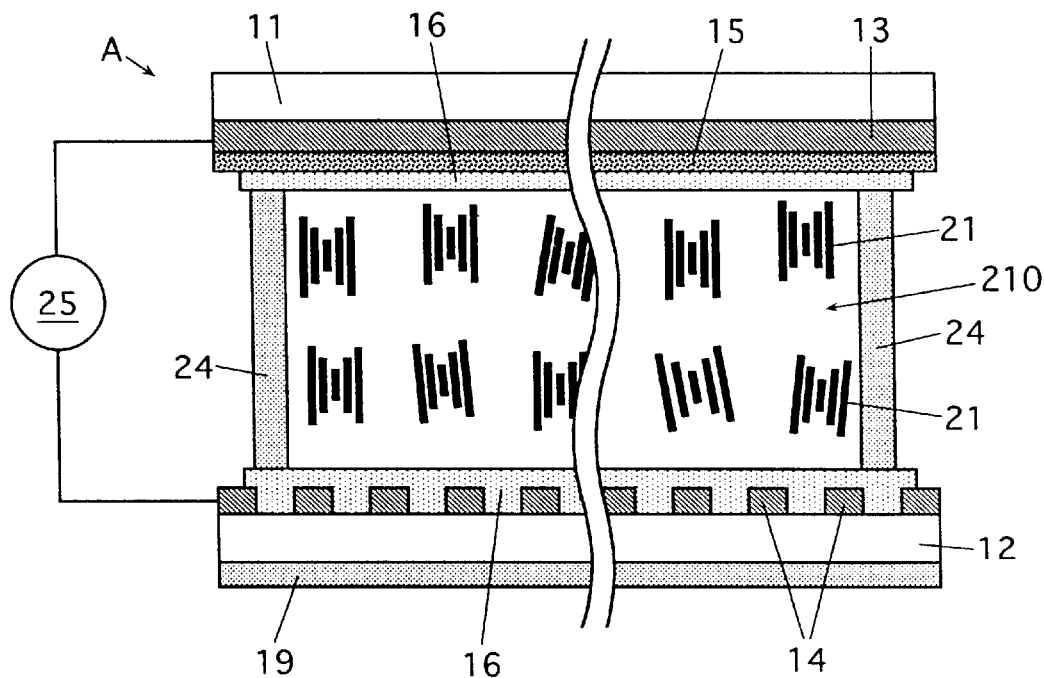
FIG. 1(A) and FIG. 1(B) schematically show an internal structure of a liquid crystal display element according to the first embodiment of the invention.
Figure 1B:
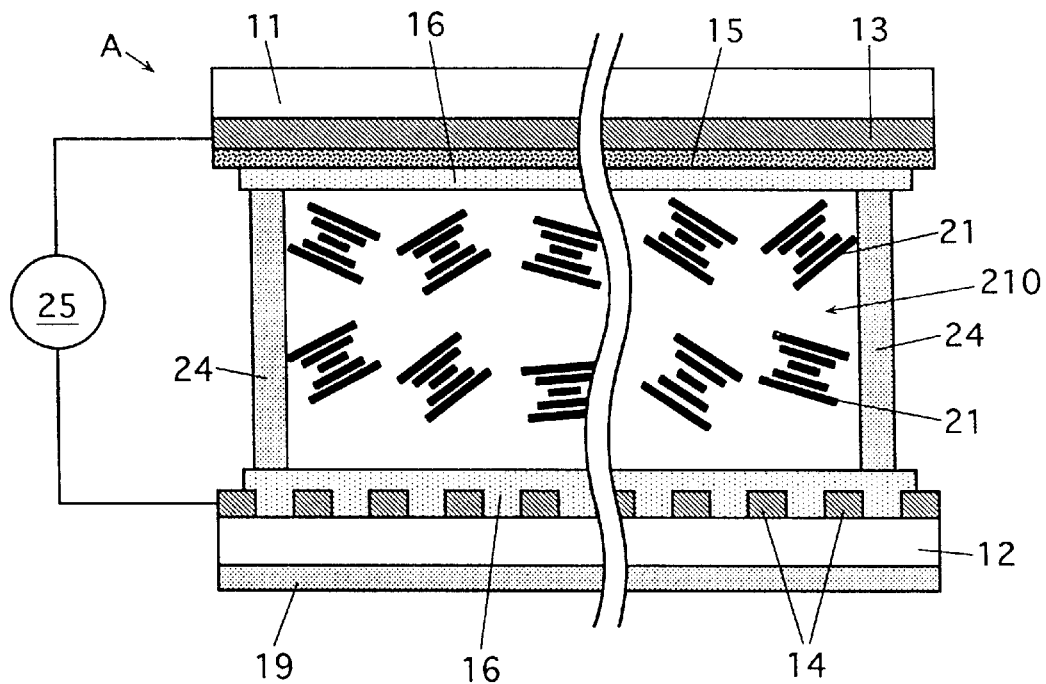

FIG. 1(A) and FIG. 1(B) schematically show an internal structure of a liquid crystal display element A according to the first embodiment of the invention. FIG. 1(A) is a view showing a focal conic state, i.e. a scattering state (transparent state, more specifically, black display state here) when a low pulse voltage from a pulse power source 25 is applied across the liquid crystal display element. FIG. 1(B) is a view showing a planar state, i.e. a colored state (white display state) when a high pulse voltage from the pulse power source 25 is applied across the liquid crystal display element.

Figure 2:
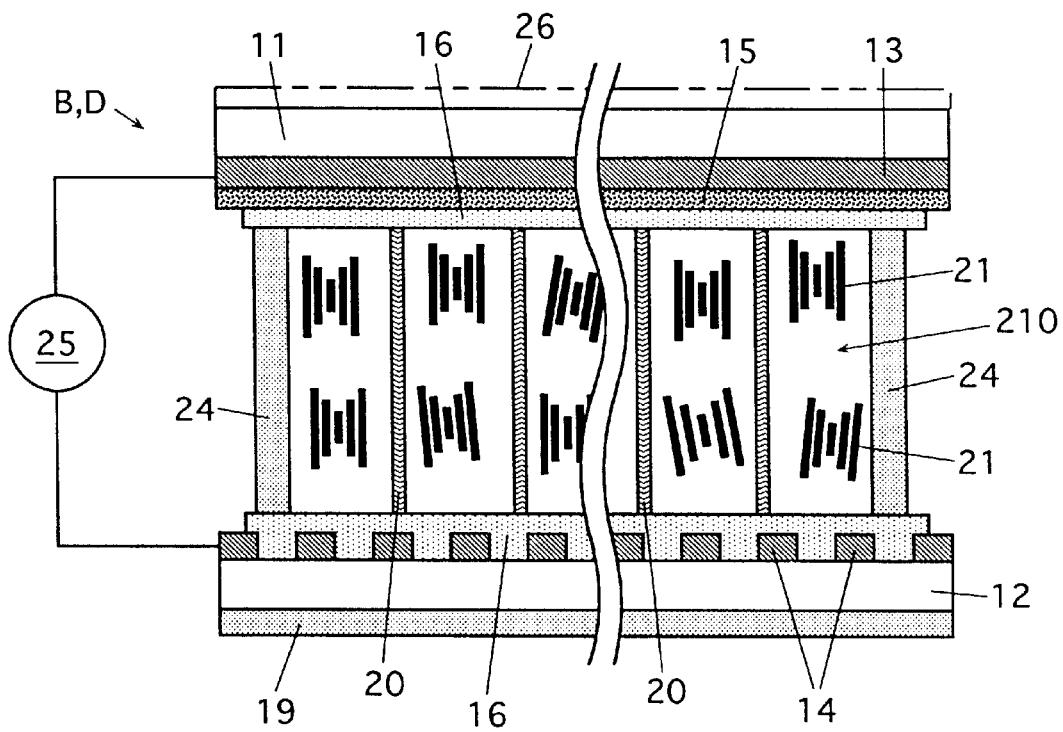
FIG. 2 schematically shows an internal structure of a liquid crystal display element according to the second and fourth embodiments of the invention, and is a view showing a focal conic state (scattering state) when a low pulse voltage from a pulse power source is applied across the liquid crystal display element.

FIG. 2 schematically shows an internal structure of liquid crystal display elements B and D according to the second and fourth embodiments of the invention, and is a view showing a focal conic state (scattering state) when a low pulse voltage from a pulse power source 25 is applied across the liquid crystal display element.

Figure 3:
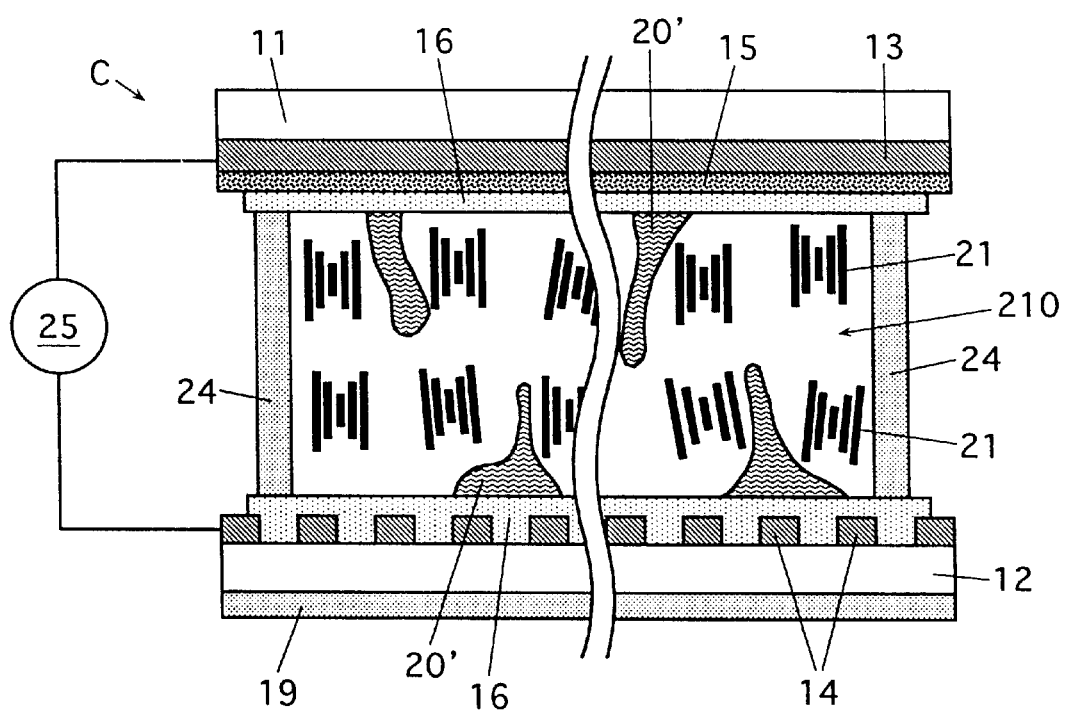
FIG. 3 schematically shows an internal structure of a liquid crystal display element according to the third embodiment of the invention, and is a view showing a focal conic state (scattering state) when a low pulse voltage from a pulse power source is applied across the liquid crystal display element.

FIG. 3 schematically shows an internal structure of a liquid crystal display element C according to the third embodiment of the invention, and is a view showing a focal conic state (scattering state) when a low pulse voltage from a pulse power source 25 is applied across the liquid crystal display element.

Like parts having like structures and like effects are indicated with like reference numerals in the liquid crystal display elements A to D shown in FIG. 1(A), FIG. 1(B), and FIGS. 2 and 3.

The liquid crystal display elements A to D have a pair of substrates 11, 12, and a liquid crystal layer 210 containing a cholesteric liquid crystal 21. At least one of the paired substrates 11, 12 (both substrates 11, 12 in this embodiment) is transparent. These substrates 11, 12 are opposed to each other as spaced away at a specified distance with a liquid crystal 21 interposed therebetween. The liquid crystal 21 is a liquid crystal composition exhibiting a cholesteric phase at room temperature. The components and formulation are described later.

The liquid crystal 21 is sandwiched between the pair of substrates 11, 12 in such a manner that the liquid crystal 21 simultaneously contacts them. The liquid crystal display elements A to D are those in which the liquid crystal 21 is substantially free of a polymer, and are structurally different from the liquid crystal display elements in which a liquid crystal is enclosed in fine regions to impart bistability, like the so-called polymer-dispersed liquid crystal display elements or polymer stabilized liquid crystal display elements in which a liquid crystal is dispersed in a reticulated polymer matrix, or droplet-type liquid crystal display elements in which a liquid crystal is enclosed in fine capsules of resins.

The substrates 11, 12 are both permeable to light as stated above. As to substrates including the substrates 11, 12 which can be used for the liquid crystal display elements of the type described herein, at least one of the paired substrates is essentially permeable to light or transparent. Glass substrates are usable as light-permeable substrates. Other substrates than glass substrates include flexible resin substrates such as those of polycarbonate, polyether sulfone, polyethylene terephthalate, polyarylate or the like.

Electrodes can be provided in the liquid crystal display elements A to D shown in FIG. 1(A), FIG. 1(B), and FIGS. 2 and 3, and other useful liquid crystal display elements. Useful electrodes are, for example, transparent electroconductive films made of typically ITO (indium tin oxide), metallic electrodes made of aluminum, silicon, etc., or photo-conductive films made of amorphous silicon or BSO (bismuth silicon oxide).

The liquid crystal display elements A to D have a plurality of strip transparent electrodes 13, 14 arranged on the surfaces of the opposed substrates at a spacing in parallel with each other such that the transparent electrodes 13, 14 are laid at right angles to each other, and display pixels exist in areas in which the transparent electrodes 13, 14 are superimposed on each other.

Such electrodes can be produced by forming an ITO film on the substrates by a sputtering method or the like and patterning by photolithography. optionally a plurality of thin film transistors (TFT) may be used as switching elements corresponding to each pixel. In the liquid crystal display elements A to D, the liquid crystal 21 is switched to a colored state or to a scattering state in each pixel area by application of a specified voltage to provide display. The term "display region" used in the specification refers to a region in which light modulation is conducted by the liquid crystal, namely images are displayed. The surrounding area is outside the display region where light modulation is not performed.

Optionally an insulating film made of an organic material and/or an inorganic material may be formed on electrodes to improve the insulating property and gas barrier property in useful liquid crystal display elements including the liquid crystal elements A to D. When required, an orientation-stabilizing film may be formed on the surface of the substrate. By selecting a material for the orientation-stabilizing film, it may be possible to impart a property of making different a planar state of liquid crystal molecules close to the substrate from that of liquid crystal molecules remote from the substrate. If this property is imparted, peak of selective reflection can be made broad.

In the liquid crystal display elements A to D, an insulating film 15 is formed on the electrodes 13 provided over the substrate 11, and an orientation-stabilizing film 16 is formed on the insulating film 15. Over the electrodes 14 on the substrate 12 is formed an orientation-stabilizing film 16.

The insulating film may be formed of not only a resin material such as acrylic, epoxy or urethane resins, but polyimide which can be used for forming an orientation-stabilizing film, silicone resin or like resin materials. A color filter made of the foregoing resin materials and dyes can be used as the insulating film.

The orientation-stabilizing film can be made of conventional materials for orientation-stabilizing films such as polyimide. Optionally it is possible to use acrylate, silane coupling agents, polysiloxane and like materials having a siloxane structure, materials containing a compound having a silicon atom, etc.

Cholesteric liquid crystals in the liquid crystal display elements of the invention as well as the cholesteric liquid crystal 21 in the liquid crystal display elements A to D are preferably those which exhibit a cholesteric phase at room temperature.

In the cholesteric liquid crystal, an integral value in a visible wavelength range of the formula (represented as a function of wavelength $\lambda$)

$$\{\exp-[2(\lambda-nP)^2/\Delta n^2 P^2]\}R$$

wherein R is a light reflectance in a selective reflection wavelength nP (n is an average refractive index of the cholesteric liquid crystal, and P is a helical pitch of the cholesteric liquid crystal) of the cholesteric liquid crystal in a colored state and $\Delta n$ is a refractive index anisotropy of the cholesteric liquid crystal is in the range of about 40% to about 60% of an integral value in a visible wavelength range of a function f ($\lambda$) representing a wavelength-light reflectance spectrum in the colored state.

Figure 4:
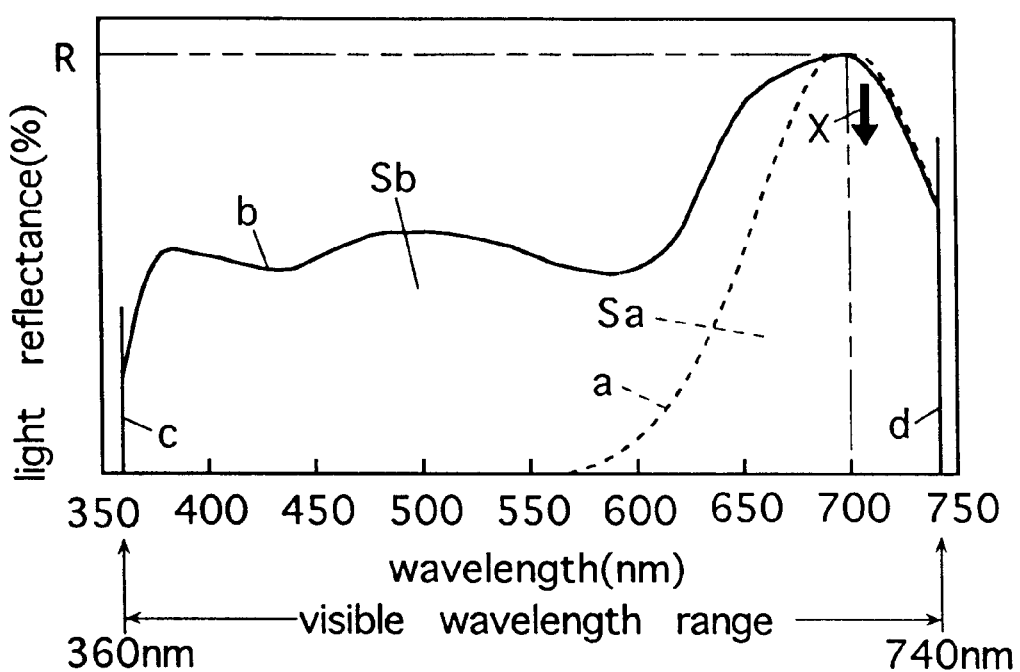
FIG. 4 shows an example of the waveform with respect to the cholesteric liquid crystal in a colored state of the liquid crystal display elements shown in FIG. 1(A), FIG. 1(B), and FIGS. 2 and 3 and a wavelength-light reflectance spectrum in the colored state, the waveform being represented by the formula (represented as a function of wavelength $\lambda$)

FIG. 4 shows a waveform (broken line a in the drawing) of the formula (represented as a function of wavelength $\lambda$)

$$\{\exp-[2(\lambda-nP)^2/\Delta n^2 P^2]\}R$$

wherein R is a light reflectance in a selective reflection wavelength nP of the cholesteric liquid crystal 21 in a colored state of the liquid crystal display elements A to D, and $\Delta n$ is a refractive index anisotropy of the cholesteric liquid crystal, and also shows an example of a wavelength-light reflectance spectrum in the colored state(line b in the drawing).

The foregoing formula $$\{\exp-[2(\lambda-nP)^2/\Delta n^2 P^2]\}R$$

represents a normal distribution function wherein R is a light reflectance in a central wavelength (selective reflection wavelength nP) and the variance is $(\Delta nP/2)^2$. The visible wavelength range involved is in a range of 360 nm to 740 nm as stated above. In the drawing, c represents a line vertical to the abscissa axis (wavelength axis) at a wavelength of 360 nm and d indicates a line vertical to the abscissa axis at a wavelength of 740 nm.

The selective reflection wavelength nP of the cholesteric liquid crystal 21 is adjusted to 700 nm in this embodiment. In the liquid crystal display elements A to D, a wavelength-light reflectance spectrum in a colored state has a maximum at a wavelength nP of 700 nm or about 700 nm and at 500 nm or about 500 nm (wavelength nP×0.7), and a reflection wavelength covers the entire wavelength range (360 nm to 740 nm in this embodiment) of visible light.

An integral value in a visible wavelength range (360 m to 740 nm) of the formula $$\{\exp-[2(\lambda-nP)^2/\Delta n^2 P^2]\}R,$$

namely an area Sa surrounded with a waveform a, a line d and the abscissa axis as shown in FIG. 4, is in the range of 40% to 60% of an integral value in a visible wavelength (360 nm to 740 nm) of a function f (λ) representing a wavelength-light reflectance spectrum in the colored state, namely an area Sb surrounded with a waveform b, lines c and d and the abscissa axis as shown in FIG. 4.

Cholesteric liquid crystals useful for liquid crystal display elements including the liquid crystal display elements A to D include, for example, a chiral nematic liquid crystal comprising a nematic liquid crystal and a proper amount of a chiral material to be described later. The foregoing chiral nematic liquid crystal exhibits a cholesteric phase at room temperature. The selective reflection wavelength is adjustable by varying the amount of the chiral material. The nematic liquid crystal can be any of, for example, known liquid crystal ester compounds, liquid crystal pyrimidine compounds, liquid crystal cyanobiphenyl compounds, liquid crystal compounds having a fluorine atom, a fluoroalkyl group, a cyano group and like polar groups, and the like, which are used alone or in combination. Preferred nematic liquid crystals are those comprising as a main component a liquid crystal compound having a positive dielectric constant anisotropy. The nematic liquid crystal may contain a dye and/or an UV absorber.

The pitch of a spiral structure of the chiral nematic liquid crystal can be varied by changing the amount of a chiral dopant (chiral material) to be added, whereby the selective reflection wavelength of the liquid crystal can be advantageously controlled. Generally the term "helical pitch" is used to mean a pitch of a spiral structure of the liquid crystal molecules, and generally refers to a distance between the liquid crystal molecules twisted by 360 degrees from each other along the spiral structure of the liquid crystal molecules.

According to the present inventors' research, a liquid crystal composition having a high refractive index anisotropy is useful for realizing good properties of the liquid crystal display element. This purpose can be achieved by using a nematic liquid crystal mixture having a high refractive index anisotropy and a chiral material which is unlikely to lower the refractive index anisotropy. However, since the range of chiral materials selected is narrowly limited compared with the range of the nematic liquid crystal mixture selected, it is desirable to select a nematic liquid crystal material having a high refractive index anisotropy, e.g. about 0.2 to about 0.32.

Examples of chiral materials to be added are cholesteric liquid crystals having a cholesteric ring, chiral nematic liquid crystals, etc. and include organic compounds capable of twisting the molecules of a nematic liquid crystal although unable to exhibit liquid crystal characteristics.

Examples of such compounds are biphenyl compounds, terphenyl compounds, ester compounds, pyrimidine compounds, azoxy compounds and the like which provide nematic liquid crystal molecules with a lamellar helical structure (molecule structure in which liquid crystal molecules are twisted by 360 degrees from each other along the spiral structure of the liquid crystal molecules). Optionally it is possible to use commercially available chiral materials, such as a compound having an optically active group as an end group. Also usable are a cholesteric liquid crystal having a cholesteric ring, typically cholesteric nonanolate.

Given below are chemical formulas (C1) to (C7) of these chiral materials.

Chemical Formulas of Chiral Materials

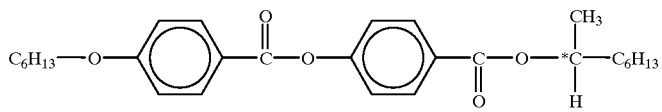

(C₁)

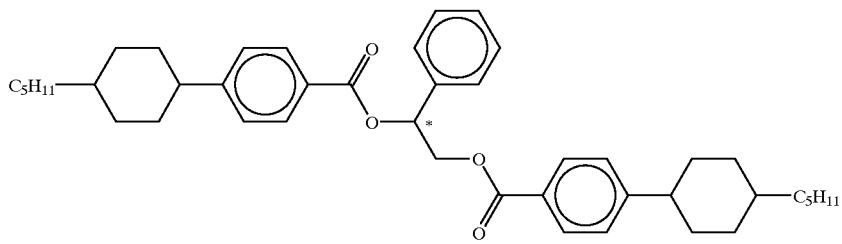

(C₂)

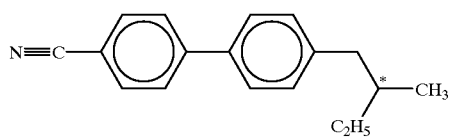

(C₃)

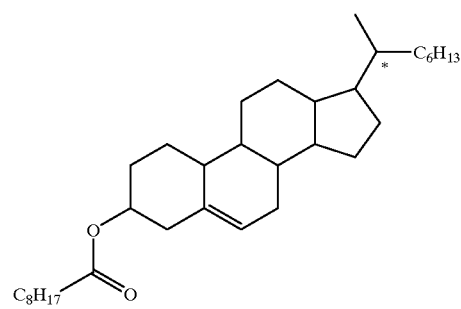

(C₄)

(C5)

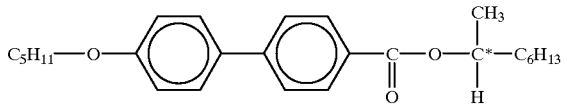

(C6)

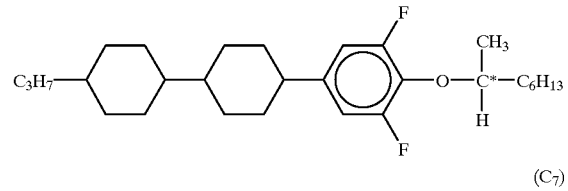

(C7)

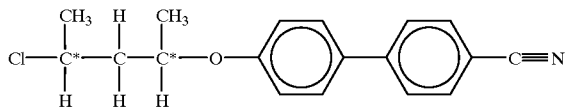

The amount of the chiral material to be used is, for example, about 10 wt % to about 45 wt %, preferably about 15 wt % to about 40 wt %, based on the total weight of the nematic liquid crystal and the chiral material. If the amount is less than 10 wt %, a sufficient degree of memory property may not be imparted (retention of the colored state in a region of colored state or retention of the scattering state in a region of scattering state after stopping the application of a voltage), whereas if it exceeds 45 wt %, a cholesteric phase is not exhibited at room temperature or the mixture is solidified. One or more kinds of chiral materials can be used. Although depending on the kind of the liquid crystal, a combination use of two or more kinds of the chiral materials may be advantageous in terms of temperature compensation and stability.

Examples of dyes to be incorporated into the chiral nematic liquid crystal are azo compounds, quinone compounds, anthraquinone compounds and the like, and conventional dyes such as dichromatic dyes. The amount of the dye to be used is, for example, 5 wt % or less, preferably 3 wt % or less, based on the combined weight of the nematic liquid crystal and the chiral material, although not limited thereto.

Examples of the UV absorber to be added to the chiral nematic liquid crystal are those which can prevent the UV degradation of a liquid crystal composition, more specifically can prevent the discoloration and the change of responsiveness with time, such as benzophenone compounds, benzotriazole compounds, salicylate compounds, etc. The amount of the UV absorber to be used is, for example, 5 wt % or less, preferably 3 wt % or less, based on the combined weight of the nematic liquid crystal and the chiral material, although not limited thereto.

By adding the dye and/or UV absorber to the chiral nematic liquid crystal in the liquid crystal display element, broad reflection peak can be brought about and the whiteness of image display can be increased.

The cholesteric liquid crystal composition may have a refractive index anisotropy of preferably about 0.18 to about 3.2, more preferably about 0.2 to about 0.3. If the refractive index anisotropy of the liquid crystal composition is lower than said range, scattering components are decreased, making it difficult to obtain broad peak of selective reflection. On the other hand, if the refractive index anisotropy of the liquid crystal composition is higher than said range, the scattering components are excessively increased, a state of transparent display (e.g. display of black background color) in a focal conic state (scattering state) is likely to become degraded (transparency is not easily exhibited), resulting in a tendency to lower the display capability. Consequently, desirably the refractive index anisotropy of the liquid crystal composition is in said range in order to obtain good contrast characteristics in a transparent state (scattering state) and in a colored state.

The cholesteric liquid crystal composition may have preferably a phase transition temperature $T_{ch-I}$ in a range of about 60° C. to about 120° C., more preferably about 70° C. to about 120° C. A temperature of higher than 120° C. will do if temperature compensation on a low temperature side is assured. However, usually if the range of temperature compensation on a high temperature side is extended, a lower limit of temperature compensation on a low temperature side would be probably raised. For this reason, it is desirable from a viewpoint of using the cholesteric liquid crystal composition for a practical display element that the phase transition temperature is within the above-mentioned range.

When the chiral nematic liquid crystal composition is used as a cholesteric liquid crystal, the chiral nematic liquid crystal composition desirably has temperature compensation such that selective reflection wavelength is scarcely shifted at least at a temperature ranging from room temperature to 60° C. The range of the temperature compensation can be realized by mixing specified proportions of a chiral material which can shift the selective reflection wavelength of a specified liquid crystal to a longer wavelength with an increase of temperature and a chiral material which can shift the selective reflection wavelength of the specified liquid crystal to a shorter wavelength with an increase of temperature, or by selecting a chiral material which is unlikely to shift the selective reflection wavelength of the specified liquid crystal depending on a temperature. The chiral nematic liquid crystal composition thus prepared, even when used in a specifically orientated state as in these embodiments, scarcely shifts the reflection waveform when viewing from an observation side.

The dielectric constant anisotropy of the cholesteric liquid crystal composition may have an upper limit of, for example, 40 or less, preferably 30 or less. If the dielectric constant anisotropy is higher than said range, a long-term reliability is not assured.

If the selective reflection wavelength of the cholesteric liquid crystal composition in the liquid crystal display element is adjusted so that it selectively reflects visible light (e.g. light in a wavelength range of 360 nm to 740 nm), more brilliant reflection is brought about. If the selective reflection wavelength is adjusted to a range of 500 nm to about 800 nm, preferably about 570 to about 630 nm, brightness and color quality (whiteness) can be both obtained.

The liquid crystal display elements of the invention including the liquid crystal display elements A to D shown in FIG. 1 to FIG. 3 may be sealed with a sealing material provided therearound to prevent leakage of the liquid crystal composition. A sealing material 24 is provided in peripheral portions of the substrates 11, 12 outside the display region between the substrates 11, 12 in the liquid crystal display elements A to D in order to enclose the liquid crystal composition 21 therewith.

Useful sealing materials are, for example, epoxy resins, acrylic resins and like thermosetting adhesives and photo-curing adhesives.

The liquid crystal display elements of the invention including the liquid crystal display elements A to D shown in FIG. 1(A) to FIG. 3 may be provided with spacers between the pair of substrates to uniformly maintain a gap between the substrates, although the spacers are not shown in the views of the liquid crystal display elements A to D.

The spacers may be spheric and may be made of resins or inorganic oxides, and also include, for example, those which can be fixed or joined to the substrate.

In the liquid crystal display elements of the invention including the liquid crystal display elements A to D shown in FIG. 1(A) to FIG. 3, a gap between the paired substrates may be supported by a plurality of structures made mainly of a polymer material to impart a high self-holding strength to the display element.

The liquid crystal display elements B and D have pillar-like structures 20 provided in a display region between the substrates 11, 12 as shown in FIG. 2. The liquid crystal display element C has small pillar-like structures 20' extending to an intermediate position in a gap between the substrates 11, 12 as shown in FIG. 3.

Description is given, first, to a structural aspect of the pillar-like structure. The pillar-like structures can be in any shape and may assume various shapes such as pillars which are circular, square or elliptic in section, although not limited thereto. The pillar-like structures may be positioned randomly or regularly. To suitably retain a gap between the paired substrates, the pillar-like structures may be equidistantly arranged, positioned as spaced away from each other at gradually varied distances, repeatedly arranged in a specific pattern, arranged in a stripe form with a specific spacing from each other, etc. The arrangement in a more or less regular form is preferred. Consideration should be taken, of course, to avoid hindering image display. The pillar-like structures can be produced, for example, by irradiating an UV-curing monomer or resist material with ultraviolet light via a mask, and removing the uncured components of the material (by photolithography), or by subjecting a thermoplastic resin to screen printing, and pressing, heating and cooling the resin for curing.

Next, methods of forming pillar-like structures are described. The pillar-like structures can be produced by various conventional methods. For example, a photo-curing resin material is applied to at least one of substrates and is irradiated with light of specified wavelength via a mask having perforations in a desired pattern to polymerize the photo-curing resin material. Then the unwanted portions are removed to give a resin structure. Another method comprises transferring a resin material to at least one of substrates by screen printing, and curing and drying the resin material. A further method comprises applying a mixture of a liquid crystal composition and a photo-curing resin material to one of the substrates, superimposing the other substrate over the coated substrate, irradiating the substrate with light of a specified wavelength via a mask having perorations in a desired pattern to polymerize the photo-curing resin material for phase separation from the mixture.

In the liquid crystal display element D shown in FIG. 2, pillar-like structures 20 are formed by a screen printing method.

The method of forming a pillar-like structure by screen printing is carried out, for example, as follows. A screen in a desired pattern is placed on electrodes over a surface of at least one of substrates. A printing material (a composition for forming a pillar-like structure, e.g. a photo-curing resin) is placed on a screen. Then, a squeegee is moved under a specified pressure at a specified rate, whereby the printing material is transferred through the pattern of the screen onto the substrate. Thereafter the transferred material is cured and dried.

When pillar-like structures are formed by a screen printing method, various resin materials as well as the above-mentioned photo-curing resin can be used. For example, epoxy resin, acrylic resin and like thermosetting resins and thermoplastic resins can be used. Examples of thermoplastic resins are polyvinyl chloride resin, polyvinylidene chloride resin, polyvinyl acetate resin, polymethacrylate ester resin, polyacrylate ester resin, polystyrene resin, polyamide resin, polyethylene resin, polypropylene resin, fluorine-containing resin, polyurethane resin, polyacrylonitrile resin, polyvinyl ether resin, polyvinyl ketone resin, polyether resin, polyvinyl pyrrolidone resin, saturated polyester resin, polycarbonate resin, chlorinated polyether resin, etc. Preferably the resin material may be used as a paste, for example, by being dissolved in a proper solvent.

When spacers are provided between a pair of substrates using a thermosetting resin or a thermoplastic resin as resin materials for pillar-like structures, for example, a liquid crystal display element can be produced as follows.

A resin material is placed on at least one of the substrates. The spacers are dispersed on at least one of the substrates, and the pair of substrates are superimposed on each other in a manner to bring to opposed positions the surfaces of the substrates on which a plurality of strip electrodes are formed. The pair of substrates thus superimposed are heated as pressed from both sides, whereby the resin material is softened and cooled for solidification to form hollow cell.

The hollow cell are made into a liquid crystal display element by vacuum injection of a liquid crystal composition into between the substrates with the pillar-like structures interposed therebetween.

It is known that generally a liquid crystal undergoes a change in properties on irradiation with a light component of 380 nm or less in wavelength. The altered properties appear as display irregularity in image display, impaired drive voltage or the like. To prevent the phenomenon, it is desirable to provide the liquid crystal display element, for example, with an UV protective filter and/or an UV protective resin film.

The liquid crystal display element may be provided with a polarizing plate or a phase plate. In this case, it is possible to form, as a protective film containing an UV absorber, an UV absorbing layer on the polarizing plate or the phase plate. Aside from the above, an UV absorbing layer may be formed on a transparent substrate.

Methods of forming an UV-absorbing layer are not limited. Any desired method can be used. For example, a typical method comprises mixing an acrylic resin, a- silicone resin or the like with an UV absorber, applying the mixture to a substrate or the like, and curing the layer. Another method comprises interposing or arranging a filter made of triacetate or the like and an UV-absorber added thereto.

Typical examples of the UV-absorber are benzophenone, benzotriazole and the like. There is no limitation on the UV-absorbers to be used herein.

The liquid crystal display elements B and D shown in FIG. 2 have an UV-absorbing filter 26 formed on an external surface of the substrate 11.

In the liquid crystal display elements of the invention including the liquid crystal display elements A to D shown in FIG. 1(A) to FIG. 3, a black or other color visible light absorbing layer may be formed on an external surface of the substrate on other side than a side on which light is incident. In the liquid crystal display elements A to D in this embodiment, a black visible light absorbing layer 19 is provided on an outer surface of the substrate 12.

The pulse power source 25 is connected to electrodes 13, 14 so that a specified pulse voltage can be applied across the electrodes 13, 14.

In the liquid crystal display elements A to D having the above-mentioned structure, image display is provided by applying a pulse voltage from the power source 25 across the electrodes 13, 14. Stated more specifically, since the liquid crystal composition 21 is capable of exhibiting a cholesteric phase, the liquid crystal 21 is set to a planar state (colored state) by applying a relatively high pulse voltage (FIG. 1(B)) so that the display element shows a broad reflection spectrum having main peak in around a selective reflection wavelength which are determined based on a cholesteric pitch (helical pitch of the liquid crystal 21) and an average refractive index of the liquid crystal 21 as shown in FIG. 4 and is brought to a white display state.

The liquid crystal 21 is set to a focal conic state (scattering state) and to a transparent state by applying a relatively low pulse voltage (FIG. 1(A)). In this embodiment, the black visible light absorbing layer 19 is formed as shown n FIGS. 1(A) to 3 so that a black background color display is provided in a focal conic state.

In common cholesteric liquid crystals, a spectrum similar to that of normal distribution as shown with a broken line in FIG. 4 is indicated and the obtained image display is high in color purity (namely low in whiteness). Even in the case of a broad reflection spectrum, if, for example, peak value in selective reflection wavelength decline in a direction shown with an arrow X in FIG. 4, the integral value based on said formula would be below the above-mentioned range, so that the obtained image display is low in contrast and dark.

According to the liquid crystal display elements A to D shown in FIG. 1(A) to FIG. 3, an integral value Sa in a visible wavelength range of the formula $$\{\exp[-2(\lambda-nP)^2/\Delta n^2 P^2]\}R$$

is 40% to 60% of an integral value Sb in a visible wavelength range of a function f ($\lambda$) representing a wavelength-light reflectance spectrum in a colored state. Consequently, the peak of light reflectance of selective reflection can be broad, the obtained image display is low in color purity (i.e. high in whiteness) in a colored state and is bright and excellent in visibility, so that sharp contrast, brightness and like characteristics can be obtained. The display element is also excellent in bistability, and a low drive voltage can be applied to display an image. Accordingly, this type of display element is advantageous in drive voltage and display characteristics, compared with conventional polymer stabilized liquid crystal display elements. Since good monochrome image display can be realized by the liquid crystal display element in a single layer, the display element can be used for manufacturing monochrome liquid crystal display panels at low costs.

Performance evaluation experiments for the liquid crystal display elements were carried out and are described below together with comparative experiments.

In the following experimental examples, Y value (luminous reflectance) and wavelength-light reflectance spectrum were evaluated using a spectrocolorimeter CM3700d having a white light source (product of Minolta Co., Ltd.).

The contrast was evaluated by calculation: (Y value in a high light reflectance state/Y value in a low light reflectance state). In experimental examples to be described later, liquid crystal display elements were brought to a high reflectance state when set to a colored state and were brought to a low reflectance state when set to a scattering state.

EXPERIMENTAL EXAMPLE 1

A nematic liquid crystal mixture (refractive index anisotropy 0.210, dielectric constant anisotropy 38.7, and isotropic phase transition temperature 115° C.) was mixed with 18.3 wt % of a chiral material represented by the formula C7, giving a chiral nematic liquid crystal composition showing a selective reflection wavelength of 510 nm. The obtained chiral nematic liquid crystal composition exhibited a cholesteric phase at room temperature.

A silicon oxide film was formed as an insulating film on ITO electrodes formed over each of two glass substrates, and an orientation stabilizing film made of a polyimide resin as a main component was formed over the entire surface of each of the silicon oxide films. A sealing material XN21S (trade name, product of Mitsui Chemicals Co., Ltd.) was applied to a peripheral portion of one of the substrates to enclose said liquid crystal composition therewith. The two substrates were placed in opposed positions and a gap between the pair of substrates was adjusted to 5 $\mu$m by interposing spacers between them in a manner to hold the liquid crystal composition therebetween. A black light absorbing layer was formed on an external surface of the substrate on other side than a side of incident light. In this way, a liquid crystal display element was produced. The obtained liquid crystal display element had substantially the same structure as the liquid crystal display element A shown in FIG. 1(A) except that the insulating film was formed on the substrate on a side on which the light absorbing layer was formed.

When a pulse voltage of 40 V was applied for 5 ms across the electrodes in the obtained liquid crystal display element, the display element was brought to an incompletely planar state (white state), and showed a Y value of 10.52 at that time. Further, when a pulse voltage of 25 V was applied for 5 ms across the electrodes in the liquid crystal display element, the display element was brought to a focal conic state (transparent state), and showed a Y value of 2.02. The contrast was 5.21.

An integral value in a visible light range (visible wavelength range) of the formula $$\{\exp[-2(\lambda-nP)^2/\Delta n^2 P^2]\}R$$

in a colored state was 48% of an integral value in a visible light range (visible wavelength range) of a function f ($\lambda$) representing a wavelength-light reflectance spectrum in the colored state.

EXPERIMENTAL EXAMPLE 2

A nematic liquid crystal mixture (refractive index anisotropy 0.254, dielectric constant anisotropy 44.9, and isotropic phase transition temperature 104° C.) was mixed with 12.9 wt % of a chiral material represented by the formula C7, giving a chiral nematic liquid crystal composition showing a selective reflection wavelength of 630 nm. The obtained chiral nematic liquid crystal composition exhibited a cholesteric phase at room temperature.

A silicon oxide film was formed as an insulating film on ITO electrodes formed over each of two glass substrates, and an orientation stabilizing film made of a polyimide resin as a main component was formed over the entire surface of each of the silicon oxide films. A sealing material XN21S (trade name, product of Mitsui Chemicals Co., Ltd.) was applied to a peripheral portion of one of the substrates to enclose said liquid crystal composition therewith. The two substrates were placed in opposed positions and a gap between the pair of substrates was adjusted to 7 μm by interposing spacers between them in a manner to hold the liquid crystal composition therebetween. A black light absorbing layer was formed on an external surface of the substrate on other side than a side of incident light. In this way, a liquid crystal display element was produced. The obtained liquid crystal display element had substantially the same structure as the liquid crystal display element A shown in FIG. 1(A) except that the insulating film was formed over the substrate on a side on which the black light absorbing layer was formed.

When a pulse voltage of 45 V was applied for 5 ms across the electrodes in the obtained liquid crystal display element, the display element was brought to an incompletely planar state (white state), and showed a Y value of 16.24 at that time. Further, when a pulse voltage of 30 V was applied for 5 ms across the electrodes in the liquid crystal display element, the display element was brought to a focal conic state (transparent state), and showed a Y value of 3.21. The contrast was 5.06.

An integral value in a visible light range (visible wavelength range) of the formula $$\{\exp[-2(\lambda-nP)^2/\Delta n^2 P^2]\}R$$

in a colored state was 50% of an integral value in a visible light range (visible wavelength range) of a function f (λ) representing a wavelength-light reflectance spectrum in the colored state.

EXPERIMENTAL EXAMPLE 3

A dichromatic dye (0.5 wt %, light absorbing maximum wavelength 665 nm) was added to the chiral nematic liquid crystal used in Experimental Example 2.

A silicon oxide film was formed as an insulating film on ITO electrodes formed over each of two glass substrates, and an orientation stabilizing film made of a polyimide resin as a main component was formed over the entire surface of each the silicon oxide films. A sealing material XN21S (trade name, product of Mitsui Chemicals Co., Ltd.) was applied to a peripheral portion of one of the substrates to enclose said liquid crystal composition therewith. The two substrates were placed in opposed positions and a gap between the pair of substrates was adjusted to 7 μm by interposing spacers between them in a manner to hold the liquid crystal composition therebetween. A black light absorbing layer was formed on an external surface of the substrate on other side than a side of incident light. In this way, a liquid crystal display element was produced. The obtained liquid crystal display element had substantially the same structure as the liquid crystal display element A shown in FIG. 1(A) except that the insulating film was formed on the substrate on a side on which the black light absorbing layer was formed.

When a pulse voltage of 45 V was applied for 5 ms across the electrodes in the obtained liquid crystal display element, the display element was brought to an incompletely planar state (white state), and showed a Y value of 14.99 at that time. Further, when a pulse voltage of 30 V was applied for 5 ms across the electrodes in the liquid crystal display element, the display element was brought to a focal conic state (transparent state), and showed a Y value of 2.88. The contrast was 5.20.

In the reflection waveform, the selective reflection peak was significantly broad. The whiteness of image display in a colored state (white state) increased compared with the liquid crystal display element of Experimental Example 2. Moreover, image display in a transparent state was clear and enhanced contrast was shown.

An integral value in a visible light range of the formula $$\{\exp[-2(\lambda-nP)^2/\Delta n^2 P^2]\}R$$

in a colored state was 46% of an integral value in a visible light range of a function f (λ) representing a wavelength-light reflectance spectrum in the colored state.

EXPERIMENTAL EXAMPLE 4

A nematic liquid crystal mixture (refractive index anisotropy 0.310, dielectric constant anisotropy 15.5, and isotropic phase transition temperature 108° C.) was mixed with 13.4 wt % of a 1:1 mixture of chiral materials each represented by the formula C2 and the formula C3, respectively, giving a chiral nematic liquid crystal composition showing a selective reflection wavelength of 590 nm. The obtained chiral nematic liquid crystal composition exhibited a cholesteric phase at room temperature.

A silicon oxide film was formed as an insulating film on ITO electrodes formed over each of two polyether sulfone (PES) substrates, and an orientation stabilizing film made of a silane coupling agent as a main component was formed over the entire surface of each of the silicon oxide films. A specified amount of spacers for adjustment of a gap to 9 μm were dispersed over one of the substrates. A sealing material XN21S (trade name, product of Mitsui Chemicals Co., Ltd.) was printed by screen printing on a peripheral portion of one of the substrates in a way to form a continuous wall. Onto the other substrate, an ink composition containing a thermoplastic resin as a main component was applied via a metal mask having perforations of about 100 μm in diameter spaced away from each other by about 500 μm, and was printed by screen printing with a squeegee, whereby pillar-like structures comprising cylinders of about 10 μm in height were formed. Thereafter the liquid crystal composition previously prepared was applied. The two substrates were fixed together by a fixing device and were heated to 150° C. for 1 hour.

A black light absorbing layer was formed on the reverse surface (external surface) of the substrate on a side on which the pillar-like structures were arranged. In this way, a liquid crystal display element was produced. The obtained liquid crystal display element had substantially the same structure as the liquid crystal display element D shown in FIG. 2 except that an UV protective filter was not provided over the substrate on a side of incident light and that an insulating film was formed over the substrate on a side on which the black light absorbing layer was formed.

When a pulse voltage of 105 V was applied for 5 ms across the electrodes in the obtained liquid crystal display element, the display element was brought to an incompletely planar state (white state), and showed a Y value of 23.07 at that time. Further, when a pulse voltage of 65 V was applied for 5 ms across the electrodes in the liquid crystal display element, the display element was brought to a focal conic state (transparent state), and showed a Y value of 3.24. The contrast was 7.12.

An integral value in a visible light range of the formula $$\{exp-[2(\lambda-nP)^2/\Delta n^2 P^2]\}R$$

in a colored state was 58% of an integral value in a visible light range of a function f (λ) representing a wavelength-light reflectance spectrum in the colored state.

EXPERIMENTAL EXAMPLE 5

A nematic liquid crystal mixture (refractive index anisotropy 0.286, dielectric constant anisotropy 17.3, and isotropic phase transition temperature 113° C.) was mixed with 12.7 wt % of a 2:3 mixture of chiral materials each represented by the formula C2 and the formula C3, respectively, giving a chiral nematic liquid crystal composition showing a selective reflection wavelength of 690 nm. The obtained chiral nematic liquid crystal composition exhibited a cholesteric phase at room temperature.

A silicon oxide film was formed as an insulating film on ITO electrodes formed over each of two glass substrates, and an orientation stabilizing film made of a polyimide resin as a main component was formed over the entire surface of each of the silicon oxide films. A sealing material XN21S (trade name, product of Mitsui Chemicals Co., Ltd.) was applied to a peripheral portion of one of the substrates to enclose said liquid crystal composition therewith. The two substrates were placed in opposed positions and a gap between the pair of substrates was adjusted to 9 µm by interposing spacers between them in a manner to hold the liquid crystal composition therebetween. A black light absorbing layer was formed on an external surface of the substrate on other side than a side of incident light. In this way, a liquid crystal display element was produced. The obtained liquid crystal display element had substantially the same structure as the liquid crystal display element A shown in FIG. 1(A) except that the insulating film was formed over the substrate on a side on which the black light absorbing layer was formed.

When a pulse voltage of 90 V was applied for 5 ms across the electrodes in the obtained liquid crystal display element, the display element was brought to an incompletely planar state (white state), and showed a Y value of 15.75 at that time. Further, when a pulse voltage of 55 V was applied for 5 ms across the electrodes in the liquid crystal display element, the display element was brought to a focal conic state (transparent state), and showed a Y value of 4.26. The contrast was 3.70.

An integral value in a visible light range of the formula $$\{exp-[2(\lambda-nP)^2/\Delta n^2 P^2]\}R$$

in a colored state was 40% of an integral value in a visible light range of a function f (λ) representing a wavelength-light reflectance spectrum in the colored state.

The liquid crystal display element was fixed to a heater and was heated to gradually elevate the temperature from room temperature. Measurement was made of a wavelength at which a light reflectance reached peak in around selective reflection wavelength nP. The measured values were 690 nm when the liquid crystal display element was heated to 25° C. and 710 nm when it was heated to 60° C. A difference was 20 nm.

COMPARATIVE EXPERIMENTAL EXAMPLE 1

A nematic liquid crystal mixture (refractive index anisotropy 0.123, dielectric constant anisotropy 8.2, and isotropic phase transition temperature 102° C.) was mixed with 32.2 wt % of a chiral material represented by the formula C3, giving a chiral nematic liquid crystal composition showing a selective reflection wavelength of 630 nm. The obtained chiral nematic liquid crystal composition exhibited a cholesteric phase at room temperature and showed a refractive index anisotropy of 0.128, a dielectric constant anisotropy of 7.0, and an isotropic phase transition temperature of 70° C.

Two glass substrates each having ITO electrodes were prepared. A silicon oxide film was formed as an insulating film on ITO electrodes formed over one of two glass substrates, and an orientation stabilizing film made of a polyimide resin as a main component was formed over the entire surface of the silicon oxide film. A sealing material XN21S (trade name, product of Mitsui Chemicals Co., Ltd.) was applied to a peripheral portion of one of the substrates to enclose said liquid crystal composition therewith. Said glass substrate and the glass substrate having only electrodes formed thereon were placed in opposed positions and a gap between the pair of substrates was adjusted to 10 µm by interposing spacers between them in a manner to hold the liquid crystal composition therebetween. A black light absorbing layer was formed on an external surface of the substrate on other side than a side of incident light. In this way, a liquid crystal display element was produced.

When a pulse voltage of 70 V was applied for 5 ms across the electrodes in the obtained liquid crystal display element, the display element was brought to a planar state, namely a colored state (white state), and showed a Y value of 6.42. Further, when a pulse voltage of 50 V was applied for 5 ms across the electrodes in the liquid crystal display element, the display element was brought to a focal conic state, namely a scattering state (transparent state), and showed a Y value of 2.48. The contrast was 2.59. The resulting display was dark and low in contrast.

The liquid crystal display element showed a relatively broad reflection spectrum in a colored state. However, an integral value in a visible wavelength range of the formula $$\{exp-[2(\lambda-nP)^2/\Delta n^2 P^2]\}R$$

in a colored state was 33% of an integral value in a visible wavelength range of a function f (λ) representing a wavelength-light reflectance spectrum in the colored state.

COMPARATIVE EXPERIMENTAL EXAMPLE 2

A nematic liquid crystal mixture (refractive index anisotropy 0.179, dielectric constant anisotropy 28, and isotropic phase transition temperature 100° C.) was mixed with 17.0 wt % of a 2:1 mixture of chiral materials each represented by the formula C3, and the formula C2, respectively, giving a chiral nematic liquid crystal composition showing a selective reflection wavelength of 600 nm. The obtained chiral nematic liquid crystal composition exhibited a cholesteric phase at room temperature and showed a refractive index anisotropy of 0.156, a dielectric constant anisotropy of 20, and an isotropic phase transition temperature of 75° C.

A silicon oxide film was formed as an insulating film on ITO electrodes formed over each of two glass substrates, and a parallel orientation film made of a polyimide resin as a main component was formed over the entire surface of each of the silicon oxide films. A sealing material XN21S (trade name, product of Mitsui Chemicals Co., Ltd.) was applied to a peripheral portion of one of the substrates to enclose said liquid crystal composition therewith. The two substrates were placed in opposed positions and a gap between the pair of substrates was adjusted to 7 µm by interposing spacers between them in a manner to hold the liquid crystal composition therebetween. A black light absorbing layer was formed on an external surface of the substrate on other side than a side of incident light. In this way, a liquid crystal display element was produced.

When a pulse voltage of 55 V was applied for 5 ms across the electrodes in the obtained liquid crystal display element, the display element was brought to a planar state, namely a reddish colored state, and showed a Y value of 12.72 at that time. Further, when a pulse voltage of 40 V was applied for 5 ms across the electrodes in the liquid crystal display element, the display element was brought to a focal conic state, namely a scattering state (transparent state), and showed a Y value of 2.18. The contrast was 5.83.

An integral value in a visible wavelength range of the formula $$\{\exp[-2(\lambda-nP)^2/\Delta n^2 P^2]\}R$$

in a colored state was 81% of an integral value in a visible wavelength range of a function f ($\lambda$) representing a wavelength-light reflectance spectrum in the colored state. The resulting image display was high in color purity, and the color was widely changed due to viewing angle.

COMPARATIVE EXPERIMENTAL EXAMPLE 3

A nematic liquid crystal mixture (refractive index anisotropy 0.286, dielectric constant anisotropy 17.3, and isotropic phase transition temperature 113° C.) was mixed with 17.0 wt % of a a 2:1 mixture of chiral materials each represented by the formula C3 and the formula C2, respectively, giving a chiral nematic liquid crystal composition showing a selective reflection wavelength of 600 nm. The obtained chiral nematic liquid crystal composition exhibited a cholesteric phase at room temperature and showed a refractive index anisotropy of 0.256, a dielectric constant anisotropy of 13, and an isotropic phase transition temperature of 80° C.

A silicon oxide film was formed as an insulating film on ITO electrodes formed over each of two glass substrates, and an orientation stabilizing film made of a polyimide resin as a main component was formed over the entire surface of each of the silicon oxide films. A sealing material XN21S (trade name, product of Mitsui Chemicals Co., Ltd.) was applied to a peripheral portion of one of the substrates to enclose said liquid crystal composition therewith. The two substrates were placed in opposed positions and a gap between the pair of substrates was adjusted to 9 µm by interposing spacers between them in a manner to hold a mixture of the liquid crystal composition with 0.09 wt % of a photopolymerization initiator (IRGACURE 187, product of Ciba-Geigy AG) and 2.9 wt % of a photo-curing monomer (R684, product of Nippon Kayaku Co., Ltd.). A black light absorbing layer was formed on an external surface of the substrate on other side than a side of incident light. While a direct current voltage of 50 V was applied across the opposed ITO electrodes in the obtained liquid crystal display element, the display element was irradiated with UV light (output 10 mW/cm2) for 5 minutes to polymerize the photo-curing monomer, giving a polymer stabilized liquid crystal display element.

When a pulse voltage of 110 V was applied for 5 ms across the electrodes in the liquid crystal display element, the display element was brought to an incompletely planar state, namely a colored state (white state), and showed a Y value of 14.85 at that time. Further, when a pulse voltage of 70 V was applied for 5 ms across the electrodes in the liquid crystal display element, the display element was brought to a focal conic state, namely a scattering state (transparent state), and showed a Y value of 4.76. The contrast was 3.11. The resulting display was dark and was low in contrast. The drive voltage was higher than in any of the experimental examples.

An integral value in a visible wavelength range of the formula $$\{\exp[-2(\lambda-nP)^2/\Delta n^2 P^2]\}R$$

in a colored state was 33% of an integral value in a visible wavelength range of a function f ($\lambda$) representing a wavelength-light reflectance spectrum in the colored state.

The results obtained in the experimental examples and comparative experimental examples are tabulated below.

| | Y value Transparent state/ white state | Contrast | Integral value ratio | Drive voltage (V) Transparent state/ white state |
|---|---|---|---|---|
| Ep.Ex.1 | 2.02/10.52 | 5.21 | 48% | 25/40 |
| Ep.Ex.2 | 3.21/16.24 | 5.06 | 50% | 30/45 |
| Ep.Ex.3 | 2.88/14.99 | 5.20 | 46% | 30/45 |
| Ep.Ex.4 | 3.24/23.07 | 7.12 | 58% | 65/105 |
| Ep.Ex.5 | 4.26/15.75 | 3.70 | 40% | 55/90 |
| Comp. Ep.Ex.1 | 2.48/6.42 | 2.59 | 33% | 50/70 |
| Comp. Ep.Ex.2 | 2.18/12.72 | 5.83 | 81% | 40/55 |
| Comp. Ep.Ex.3 | 4.76/14.85 | 3.11 | 33% | 70/110 |

Note:
Ep. = Experimental, Ex. = Example, Comp. = Comparative

In the case of the liquid crystal display elements of Experimental Examples 1 to 5 showing an integral value ratio ranging from 40% to 60%, monochrome image display, which was bright and excellent in visibility, was realized utilizing a white state and a black state as a background color. Sharp contrast, brightness and like characteristics were obtained. Moreover, a relatively low drive voltage was applicable in any of experiments.

On the other hand, in the case of the liquid crystal display elements of Comparative Experimental Examples 1 and 3 showing an integral value ratio of less than 40%, the resulting display was dark and low in contrast. The liquid crystal display element of Comparative Experimental Example 3 involved a relatively high drive voltage. In the liquid crystal display element of Comparative Experimental Example 2 showing an integral value ratio of higher than 60%, image display was high in color purity and the color was widely changed due to a viewing angle.

[2] Embodiments Relating to the Aforementioned Second and Third Liquid Crystal Display Elements of the Present Invention The embodiments of liquid crystal display elements described herein basically comprise a liquid crystal layer containing a liquid crystal composition as interposed between a pair of opposed substrates at least one of which is permeable to light.

At least one of the paired substrates has a functional layer or surface in contact with the liquid crystal composition which layer or surface is capable of adjusting an orientated state of liquid crystal molecules in the liquid crystal composition close to the substrate and an orientated state of liquid crystal molecules in the liquid crystal composition remote from the substrate to make the former orientated state different from the latter (offing).

The foregoing liquid crystal composition comprises a nematic liquid crystal mixture having a refractive index anisotropy of 0.2 to 0.34 and at least one species of chiral materials. The liquid crystal composition exhibits a cholesteric phase at room temperature and is a chiral nematic liquid crystal having a phase transition temperature of 60° C. or higher and a positive dielectric constant anisotropy. The liquid crystal layer has a wavelength range of selectively reflected light which covers the entire range of 480 nm to 700 nm.

The foregoing liquid crystal composition may have a selective reflection wavelength adjusted to a visible wavelength range.

The above-mentioned functional surface may be provided on any one or both of the paired substrates in any of the liquid crystal display elements. The functional surface of one or each of the substrates is capable of, e.g. adjusting an orientated state of liquid crystal molecules in the liquid crystal composition close to the substrate and an orientated state of liquid crystal molecules in the liquid crystal composition remote from the substrate to make the former orientated state different from the latter. While electrodes (generally transparent electrodes) are usually formed on the substrate(s), the functional surface may be provided on the side of the liquid crystal composition rather than on such electrodes.

The foregoing liquid crystal display elements can be used as a liquid crystal display element of the reflection type utilizing selective reflection of cholesteric liquid crystal. In this case, monochrome image display is feasible by using a black or like color as a background color.

In said liquid crystal display element, at least one of the paired substrates has a functional surface in contact with the liquid crystal composition which surface is capable of
  adjusting an orientated state of liquid crystal molecules in the liquid crystal composition close to the substrate and an orientated state of liquid crystal molecules in the liquid crystal composition remote from the substrate to make the former orientated state different from the latter, and
  the liquid crystal composition is a chiral nematic liquid crystal which comprises a nematic liquid crystal mixture having a refractive index anisotropy of 0.2 to 0.34 and at least one species of chiral materials (or at least one species of chiral materials added to the mixture to adjust the selective reflection wavelength to a visible wavelength range).

Further, the liquid crystal composition exhibits a cholesteric phase at room temperature and has a phase transition temperature of 60° C. or higher and a positive dielectric constant anisotropy.

Still further, the liquid crystal layer has a wavelength range of selectively reflected light which covers the entire range of 480 nm to 700 nm.

Therefore, peak of light reflectance of selective reflection can be broad, and the obtained image display is low in color purity (high in whiteness), bright and excellent in visibility. For example, when monochrome image display is realized utilizing a black or like color as a background color, sharp contrast, brightness and like characteristics can be gained. The display element is outstanding in bistability, and assures a wide range of temperature compensation. Examples of the foregoing functional surface are a surface containing a silicon atom or siloxane skeleton, a surface containing a polyimide skeleton, and a surface made of acrylate and polyimide compound.

In the liquid crystal display element containing the liquid crystal composition with a selective wavelength adjusted to a visible wavelength range, the visible wavelength range may be a generally acceptable visible wavelength range which ranges, for example, from about 360 nm to about 740 nm.

A desirable range of selective wavelength adjusted to a visible wavelength range is, e.g. about 550 nm to about 650 nm, preferably about 580 nm to about 620 nm at which a luminous reflectance is high.

In any case, the foregoing chiral nematic liquid crystal may have a dielectric constant anisotropy in a range of, e.g. preferably about 5 to about 40, more preferably about 10 to about 30. The above-mentioned nematic liquid crystal mixture may have a refractive index anisotropy preferably in a range of e.g., about 0.22 to about 0.32.

At any rate, the nematic liquid crystal mixture preferably contains 30 wt % or more of at least one of a liquid crystal cyanobiphenyl compound and a liquid crystal cyanoterphenyl compound. In this case, it is preferable that the nematic liquid crystal mixture contains the cyanobiphenyl compound in a larger proportion than the cyanoterphenyl compound in order to control the crystallinity of the cyanoterphenyl compound.

Examples of the foregoing chiral nematic liquid crystal composition are the followings.
  (a) The proportion of the chiral material(s) is in a range of 10 wt % to 45 wt %.
  (b) Two or more species of the chiral materials are contained.
  (c) The refractive index anisotropy is in a range of 0.18 to 0.32.
  (d) The phase transition temperature ranges from 60° C. to 120° C.
  (e) The composition contains at least one species of chiral materials having a CN group in the terminal.
  (f) The composition contains a dye.
  (g) The composition contains an UV absorber.
  (h) A combination of two or more of the (a) to (g) is employed.

In either case, it is optional to provide a plurality of structures made chiefly of a polymer material (structures made of a resin, a resin composition or the like) between a pair of substrates in order to retain the distance between the substrates and/or to increase the strength or for other purposes. Optionally an UV protective filter may be provided in one of the paired substrates.

Next, description is given to examples of the liquid crystal display elements of the type described hereinbefore with reference to FIG. 5(A) to FIG. 8.

FIG. 5(A) and FIG. 5(B) schematically show internal structures of liquid crystal display elements A' and D' according to the 5th and 8th embodiments of the invention. FIG. 5(A) is a view showing a focal conic state (transparent state, more specifically, black display state here) when a low pulse voltage from the pulse power source 25 is applied across the liquid crystal display element. FIG. 5(B) is a view showing a planar state (white display state) when a high pulse voltage from the pulse power source 25 is applied across the liquid crystal display element.

FIG. 6 schematically shows an internal structure of the liquid crystal display element B' according to the 6th embodiment of the invention, and is a view showing a focal conic state when a low pulse voltage from the pulse power source 25 is applied across the liquid crystal display element.

FIG. 7 schematically shows an internal structure of a liquid crystal display element C' according to the 3rd embodiment of the invention, and is a view showing a focal conic state when a low pulse voltage from the pulse power source 25 is applied across the liquid crystal display element.

Like parts having like structures and like effects are indicated with like reference numerals in the liquid crystal display elements A' to D' shown in FIG. 5(A), FIG. 5(B), and FIGS.6 and 7. The liquid crystal display elements A' to D' have memory capability so that after stopping the application of a pulse voltage, a region of colored state and a region of scattering state are kept in the colored state and the scattering state, respectively.

The liquid crystal display elements A' to D' shown in FIG. 5(A), FIG. 5(B), and FIGS.6 and 7 comprise a pair of substrates 11, 12 and a liquid crystal layer 210 containing a liquid crystal composition 21. At least one of the paired substrates 11, 12 (both substrates 11, 12 in this embodiment) is transparent. The substrates 11, 12 are opposed to each other and spaced away from each other at a specified distance, and have the liquid crystal 21 interposed therebetween. The liquid crystal 21 is a liquid crystal composition which exhibits a cholesteric phase at room temperature. The materials and formulation of the liquid crystal 21 are described later.

The liquid crystal 21 is sandwiched between the pair of substrates 11, 12 in such a manner that the liquid crystal 21 simultaneously contacts them. The liquid crystal display elements A' to D' are different from the so-called polymer-dispersed liquid crystal display elements in which a liquid crystal is dispersed in a reticulated polymer matrix, or from liquid crystal display elements in which a polymer exists in a manner to hinder synchronized contact of the liquid crystal with the substrates like liquid crystal display elements in which a liquid crystal is enclosed in fine capsules of resins. In the liquid crystal display elements, for example, pillar-like resin structures may be provided to bring the liquid crystal into simultaneous contact with the substrates, or resin structures do not exist between the substrates.

The substrates 11, 12 are both permeable to light as stated above. As to the pairs of substrates useful for the liquid crystal elements including the substrates 11, 12, at least one of the paired substrates is essentially permeable to light or transparent. For example, glass substrates are usable as light-permeable substrates. Other useful substrates than glass substrates include flexible substrates such as those made of polycarbonate, polyether sulfone, polyethylene terephthalate or the like.

Electrodes can be provided in the liquid crystal display elements A' to D'. Useful electrodes are, for example, transparent electroconductive films made of typically ITO (indium tin oxide), metallic electrodes made of aluminum, silicon or the like and photoconductive films made of amorphous silicon or BSO (bismuth silicon oxide).

The liquid crystal display elements A' to D' have a plurality of strip transparent electrodes 13, 14 arranged on the surfaces of the substrates 11, 12 at a spacing in parallel with each other. The substrates 11, 12 are opposed to each other such that the transparent electrodes 13, 14 are arranged at right angles to each other. In this structure, each display pixel is an area in which the transparent electrodes 13, 14 are superimposed on each other.

Such electrodes can be produced by forming an ITO film on the substrates by a sputtering method or the like and patterning by photolithography. Optionally a plurality of thin film transistors (TFT) may be used as switching elements corresponding to each pixel. The term "display region" used in the specification refers to a region in which light modulation is conducted by the liquid crystal, namely image display is provided. The surrounding area is an area outside the display region where light modulation is not effected.

In the liquid crystal display elements A' to D ', at least one of the paired substrates has a functional layer (which provides a functional surface) in contact with the liquid crystal composition which layer is capable of adjusting an orientated state of liquid crystal molecules in the liquid crystal composition close to the substrate and an orientated state of liquid crystal molecules in the liquid crystal composition remote from the substrate to make the former orientated state different from the latter. Optionally an insulating film made of an organic material and/or an inorganic material may be formed on the electrodes to improve the insulating property and gas barrier property.

In the liquid crystal display elements A' to D', an insulating film 15 is formed on the electrodes 13 formed on the substrate 11, and a functional layer 16 is formed on the insulating film 15. The electrodes 14 are formed on the substrate 12 and the functional layer 16 is formed on the electrodes 14.

The insulating film may be formed of a material selected from not only resin materials such as acryl, epoxy and urethane resins, but also polyimide which can be used for forming an orientation-stabilizing film, silicone and like resin materials. A color filter made of the foregoing resin materials and dyes added thereto can be used as an insulating film.

Usable as materials for forming a functional layer are, for example, materials for orientation films. Especially better characteristics can be obtained by use of a silane coupling agent, polysiloxane and like materials containing a compound having a siloxane structure or a silicon atom, etc.

If materials for forming the functional layer contain, at a side chain, cholesterol skeleton, adamantyl skeleton, polycyclic skeleton, dendrimer skeleton (star-burst type compounds) or an alkyl group having 3 or more carbon atoms, a liquid crystal composition would be given more proper orientated state of the molecules. In this case, a substitution ratio of the side chain is, e.g. 1% to 50% (or less than 50%), when calculated based on a total of atoms which can be attached to carbon atoms and nitrogen atoms that form the main chain.

Given below are the formulas (D1) to (D5) of the foregoing compounds.

adamantyl skeleton (D1)

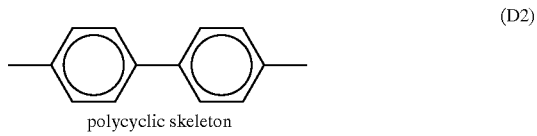
polycyclic skeleton (D2)

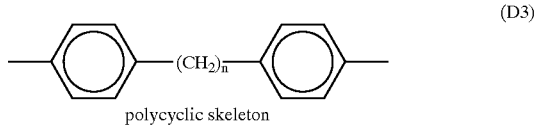
polycyclic skeleton (D3)

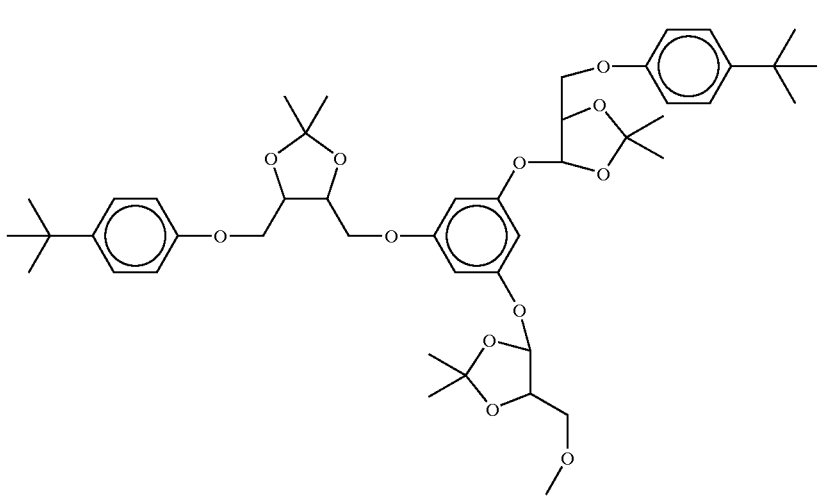

(D4) dendrimer skeleton (star-burst type compound)

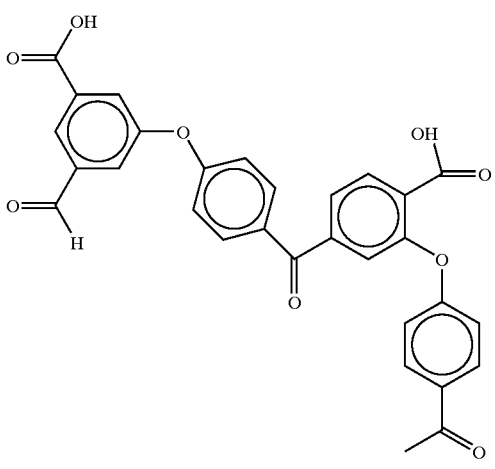

(D5) dendrimer skeleton (star-burst type compound)

The functional layer may be formed on both or any one of the two substrates. In the liquid crystal display elements A' to D', the functional layer is provided on each of the two substrates, as described above.

The liquid crystal composition 21 in the liquid crystal display elements A' to D' shown in FIG. 5(A), FIG. 5(B), FIG. 6 and FIG. 7 is a chiral nematic liquid crystal composition which comprises a nematic liquid crystal mixture having a refractive index anisotropy of 0.2 to 0.34 (preferably 0.22 to 0.32) and at least one species of chiral materials added to the mixture. The liquid crystal composition exhibits a cholesteric phase at room temperature and has a phase transition temperature of 60° C. or higher and a positive dielectric constant anisotropy. The liquid crystal composition may further contain a dye.

The nematic liquid crystal mixture may contain preferably a large proportion of a liquid crystal compound having a polar group in the terminal because an orientated state of liquid crystal molecules can be effectively adjusted by the functional layer. If the polar group is a CN group, a better result would be obtained.

According to the present inventors' research, a liquid crystal composition having a high refractive index anisotropy is useful for the liquid crystal display element to realize good element characteristics. For this purpose, a nematic liquid crystal mixture having a high refractive index anisotropy can be used in combination with a chiral material which would scarcely reduce the refractive index anisotropy. However, since the scope of chiral materials to be selected is narrowly limited compared with the scope of the nematic liquid crystal mixture to be selected, it is desirable to select a nematic liquid crystal mixture having a high refractive index anisotropy, e.g. about 0.2 to about 0.34, preferably about 0.2 to about 0.32.

To realize a high refractive index anisotropy and to increase stability, the nematic liquid crystal mixture may contain preferably a liquid crystal cyanobiphenyl compound and a liquid crystal cyanoterphenyl compound, more preferably 30 wt % or more of at least one of these compounds. Since the liquid crystal cyanoterphenyl compound increases the viscosity, the amount of the cyanoterphenyl compound is preferably limited to a range sufficient to extend the range of temperature compensation, and is desirably less than the amount of the liquid crystal cyanobiphenyl compound.

Given below are the formula (A) of the liquid crystal cyanobiphenyl compound which can be used and the formula (B) of the liquid crystal cyanoterphenyl compound which can be used, together with the formulas of specific examples of useful liquid crystal cyanobiphenyl compounds A1–A16 and useful liquid crystal cyanoterphenyl compounds B1–B8. Useful compounds are not limited to those described below.

(A) Formula of the Liquid Crystal Cyanobiphenyl Compound

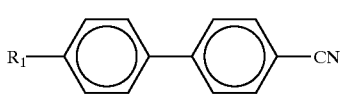

(A)

wherein R1 is alkyl group having 1 to 10 carbon atoms or alkoxyl group having 1 to 10 carbon atoms.

Specific Example of the Liquid Crystal Cyanobiphenyl Compound
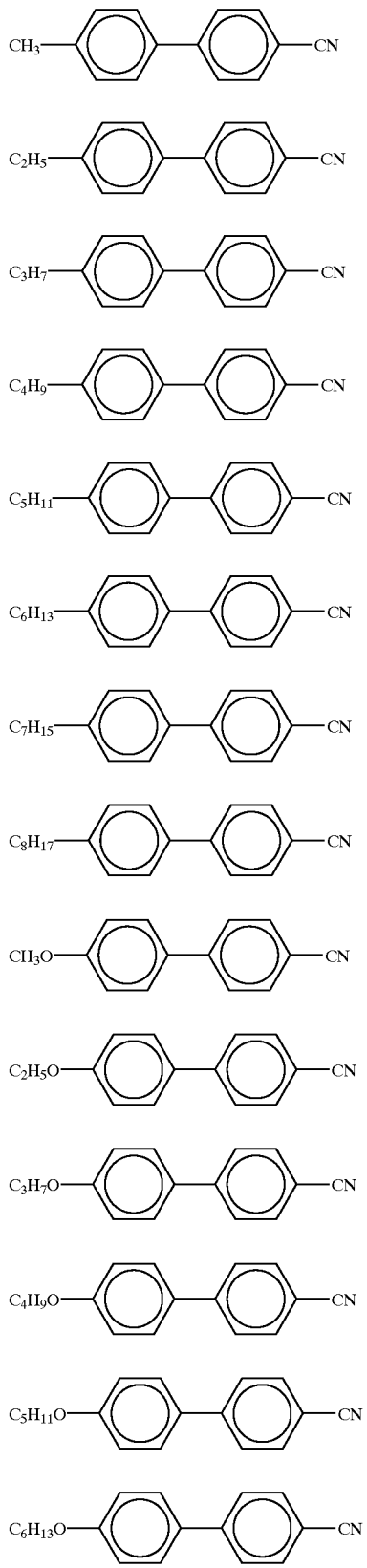
(A1) (A2) (A3) (A4) (A5) (A6) (A7) (A8) (A9) (A10) (A11) (A12) (A13) (A14)
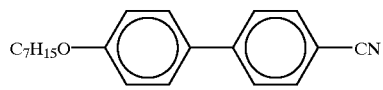
(A15)
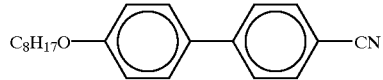
(A16)
(B) Formula of the Liquid Crystal Cyanoterphenyl Compound
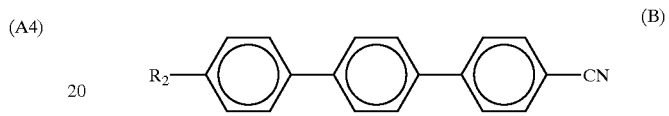
(B)
wherein R2 is alkyl group having 1 to 6 carbon atoms or alkoxyl group having 1 to 6 carbon atoms.
Specific Example of the Liquid Crystal Cyanoterphenyl Compound
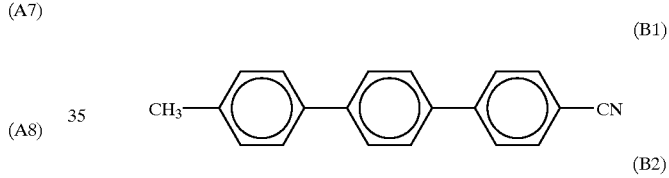
(B1)
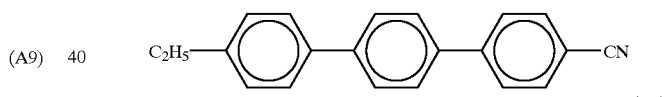
(B2)
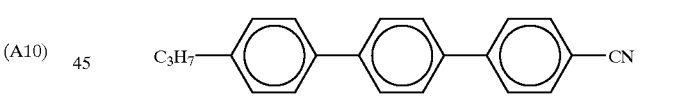
(B3)
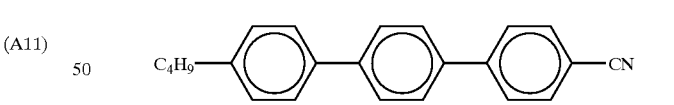
(B4)
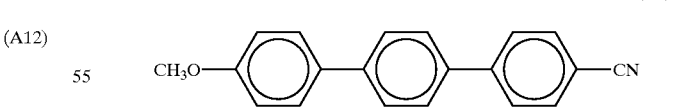
(B5)
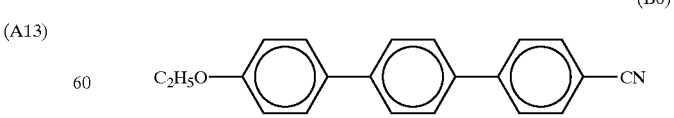
(B6)
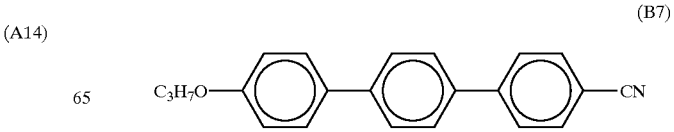
(B7)

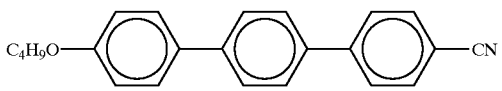

(B8)

As the chiral material to be added to the nematic liquid crystal, a material that induces a lamellar herical structure (a molecule structure in which layers of liquid crystal molecules are helically twisted from each other) of the nematic liquid crystal can be employed. More specifically, biphenyl compounds, terphenyl compounds, ester compounds, pyrimidine compounds, azoxy compounds and the like can be employed.

It is optional to use commercially available chiral materials having an optically active group as an end group. Also usable are cholesteric liquid crystals having a cholesteric ring, typically cholesteric nonanolate.

The formulas (C1 to C7) can be mentioned as those of the chiral materials, which are described hereinbefore concerning the liquid crystal display elements shown in FIG. 1(A), FIG. 1(B), FIG. 2 and FIG. 3.

The amount of the chiral material to be used is, for example, about 10 wt % to about 45 wt %, preferably about 15 wt % to about 40 wt %, based on the total weight of the nematic liquid crystal and the chiral material. If the amount is less than 10 wt %, a sufficient degree of memory property may not be imparted (retention of colored state in a region of colored state or retention of scattering state in a region of scattering state after stopping the application of a voltage), whereas if it exceeds 45 wt %, a cholesteric phase is not exhibited at room temperature or solidification may occur. Either one or more kinds of chiral materials can be used. Although depending on the kind of liquid crystal, a combination of two or more kinds of chiral materials may be advantageous in terms of temperature compensation and stability.

Examples of dyes to be incorporated into the chiral nematic liquid crystal are azo compounds, quinone compounds, anthraquinone compounds and the like, and may include various conventional dyes such as dichromic dyes, UV absorbing dyes and the like. The amount of the dye to be used is, for example, 5 wt % or less, preferably 3 wt % or less, based on the combined weight of the nematic liquid crystal and the chiral material, although not limited thereto.

The effects of the dye to be added to the chiral nematic liquid crystal are, for example, to obtain broad reflection peak, to increase the whiteness in image display, to prevent occurrence of scattering on a short wavelength side in order to display a clear background color (e.g. black color), for example, when is monochrome image display is provided using a black color or like background color.

When an UV absorbing dye is used as a dye, useful UV absorbing dyes may include those which can prevent UV deterioration of a liquid crystal composition, e.g. discoloration and change of responsiveness with time, such as benzophenone compounds, benzotriazole compounds, salicylate compounds, etc.

The chiral nematic liquid crystal composition for use herein may have a refractive index anisotropy of preferably about 0.18 to about 0.32, more preferably about 0.21 to about 0.32. If the refractive index anisotropy of the liquid crystal composition is lower than said range, scattering components are decreased, making it difficult to obtain broad peak of selective reflection. On the other hand, if the refractive index anisotropy of the liquid crystal composition is higher than said range, the scattering components are excessively increased, a state of transparent display (e.g. display of black background color) in a focal conic state is likely to deteriorate (transparency is not easily exhibited), resulting in a tendency to lower the display capability. Consequently, desirably the refractive index anisotropy of the liquid crystal composition is in said range in order to obtain good contrast characteristics in a transparent state (scattering state) and in a colored state.

The chiral nematic liquid crystal composition may have a phase transition temperature T chI in a range of preferably about 60° C. to about 120° C., more preferably about 70° C. to about 120° C. Even a temperature of higher than 120° C. will do if temperature compensation on a low temperature side is assured. However, usually if the range of temperature compensation on a high temperature side is extended, a lower limit of temperature compensation on a low temperature side would be probably raised. For this reason, it is desirable from a viewpoint of using the liquid crystal composition for practically useful display elements that the temperature compensation is within the above-mentioned range.

The chiral nematic liquid crystal composition desirably may have a temperature compensation range such that selective reflection wavelength is scarcely shifted at least at a temperature ranging from room temperature to 60° C. The foregoing range of temperature compensation can be realized by mixing specified proportions of a chiral material which can shift the selective reflection wavelength of a specified liquid crystal to a long wavelength with an increase of temperature and a chiral material which can shift the selective reflection wavelength of the specified liquid crystal to a short wavelength with an increase of temperature, or by selecting a chiral material which is unlikely to shift the selective reflection wavelength of the specified liquid crystal with an increase of temperature. The chiral nematic liquid crystal composition thus prepared, even when used in a specifically orientated state as in these embodiments, scarcely shifts the reflection waveform when viewing from an observation side.

The dielectric constant anisotropy of the chiral nematic liquid crystal composition is, for example, preferably at least 5, more preferably at least 10, most preferably at least 15. An upper limit of said dielectric constant anisotropy is, for example, 40 or less, preferably 30 or less. If the dielectric constant anisotropy is excessively high, a long-term reliability may not be assured, whereas a dielectric constant anisotropy lower than 5 may result in excessive increase of drive voltage.

If the selective reflection wavelength of the chiral nematic liquid crystal composition is adjusted so that the display element selectively reflects visible light (e.g. light of 360 nm to 740 nm in wavelength range), more brilliant reflection is brought about. If the wavelength is adjusted to a range of about 550 nm to about 650 nm, preferably about 580 to about 620 nm, brightness and color quality (whiteness) can be both obtained.

The liquid crystal display elements A' to D' may be sealed with a sealing material provided therearound to prevent leakage of the liquid crystal composition. A sealing material 24 is provided in peripheral portions of the substrates 11, 12 outside the display region between the substrates 11, 12 in the liquid crystal display elements A' to D' to enclose the liquid crystal composition 21 therewith.

Useful sealing materials are, for example, epoxy resins, acrylic resins and like thermosetting or photo-curing adhesive agents.

The liquid crystal display elements A' to D' may be provided with spacers between a pair of substrates to uniformly maintain a gap between the substrates, although the spacers are not shown in the liquid crystal display elements A' to D'.

The spacers may be spheric and may be made of resins or inorganic oxides, and also may include, for example, those which can be fixed or adhered to the substrate.

In the liquid crystal display elements A' to D', a gap between the paired substrates may be supported by a plurality of structures made mainly of a polymer material to impart a high self-preserving property to the display element.

The liquid crystal display elements A' to D' may have pillar-like structures 20 provided in a display region between the substrates 11, 12 as shown in FIG. 5(A) and FIG. 5(B). The liquid crystal display element C has small pillar-like structures 20' extending to an intermediate position in the gap between the substrates 11, 12 as shown in FIG. 7.

These pillar-like structures are formed in the same shape by the same method and are arranged in the similar positions as described hereinbefore concerning FIGS. 2 and 3.

The pillar-like structure 20 may be formed by a screen printing method in the liquid crystal display element D' shown in FIG. 5(A) and FIG. 5(B).

The method of forming a pillar-like structure by a screen printing method is the same method as described hereinbefore concerning FIG. 2.

The same resin materials as stated above are usable for forming a pillar-like structure by a screen printing method.

Spacers can be provided between a pair of substrates using a thermosetting resin or a thermoplastic resin as resin materials for pillar-like structures. In this case, for example, a liquid crystal display element can be produced, for example, as follows.

A resin material is placed on at least one of the substrates as stated above. Spacers are dispersed on at least one of the substrates, and the pair of substrates are superimposed on each other in a manner to bring to opposed positions the surfaces of the substrates on which a plurality of strip electrodes are formed. The pair of substrates thus superimposed are heated as pressed from both sides, whereby the resin material is softened and is cooled for solidification to form a hollow cell.

The hollow cell is made into a liquid crystal display element, for example, by injecting a liquid crystal composition into between the substrates with the pillar-like structures interposed therebetween by a vacuum injection method.

It is known that generally a liquid crystal undergoes a change in properties on irradiation with a light component of 380 nm or less in wavelength. The foregoing altered properties appear as display irregularity in image display, impaired drive voltage or the like. To prevent the phenomenon, it is desirable to provide the liquid crystal display element with, e.g. an UV protective filter and/or an UV protective resin film.

The liquid crystal display element can be provided with a polarizing plate or a phase plate. In this case, it is possible to form, an UV absorbing layer as a protective film containing an UV absorber on the polarizing plate or the phase plate. Aside from the above, an UV absorbing layer may be formed on a substrate.

Methods of forming an UV-absorbing layer are not limited. Any desired method can be used. For example, a typical method comprises mixing an acrylic resin, a silicone resin or the like with an UV absorber, applying the mixture to a substrate, and curing the layer. Another method comprises interposing a filter made of a mixture of triacetate or the like and an UV-absorbing material.

Typical examples of UV-absorbing materials are benzophenone, benzotriazole and the like. There is no limitation on UV-absorbing materials to be used herein.

The liquid crystal display elements A' and D' shown in FIG. 5(A) and FIG. 5(B) have an UV-absorbing filter 26 formed on an external surface of the substrate 11.

In the liquid crystal display elements including the liquid crystal display elements A' to D', a black or other color visible light absorbing layer may be formed on an external surface of the substrate on other side than a side on which light is incident. In the liquid crystal display elements A' to D', a black visible light absorbing layer 19 is provided on an outer surface of the substrate 12.

The pulse power source 25 is connected to electrodes 13, 14 so that a specified pulse voltage can be applied across the electrodes 13, 14.

In the liquid crystal display elements A' to D' having the above-mentioned structure, image display is provided by applying a pulse voltage from the power source 25 across the electrodes 13, 14.

FIG. 8 shows an example of the wavelength-light reflectance spectrum of the liquid crystal display elements A' to D'. Since the liquid crystal composition 21 is capable of exhibiting a cholesteric phase, the liquid crystal 21 can be set to a planar state (FIG. 5(B)) by applying a relatively high pulse voltage so that the display element shows a broad reflection spectrum having main peak in around a wavelength which is determined based on a cholesteric pitch (helical pitch of the liquid crystal 21) and an average refractive index of the liquid crystal 21 as shown in FIG. 8. Therefore, the state is realized in which reflected light is obtainable in the entire wavelength range of 480 nm to 700 nm, and the element is brought to a white state.

The liquid crystal 21 is brought to a focal conic state and to a transparent state by applying a relatively low pulse voltage (FIG. 5(A)). In these embodiments, a black visible light absorbing layer 19 is formed as shown in FIG. 5(A), FIG. 5(B), FIG. 6 and FIG. 7, so that black background color display is given when the display element is in a focal conic state.

In a common cholesteric liquid crystal, a spectrum similar to that of normal distribution shown with a broken line in FIG. 8 is indicated and the resulting display is high in color purity (namely low in whiteness). Even in the case of a broad reflection spectrum, if, for example, peak value of selective reflection wavelength decline in a direction shown with an arrow X in FIG. 8, the resulting display is low in contrast and dark.

According to the liquid crystal display elements A' to D', at least one of the paired substrates has a functional layer 16 in contact with the liquid crystal composition, the functional layer 16 being capable of adjusting an orientated state of liquid crystal molecules in the liquid crystal composition close to the substrate and an orientated state of liquid crystal molecules in the liquid crystal composition remote from the substrate to make the former orientated state different from the latter. The liquid crystal composition 21 comprises a nematic liquid crystal mixture having a refractive index anisotropy of 0.2 to 0.34 and at least one species of chiral materials admixed therewith for adjustment of selective reflection wavelength to a visible wavelength range. The liquid crystal composition 21 is a chiral nematic liquid crystal exhibiting a cholesteric phase at room temperature and having a phase transition temperature of 60° C. or higher and a positive dielectric constant anisotropy. The liquid crystal layer 210 has a wavelength range of selectively reflected light which covers the entire range of 480 nm to 700 nm. Therefore, the peak of light reflectance of selective reflection can be broad. Accordingly, the obtained monochrome image display is low in color purity (i.e. high in whiteness), bright and excellent in visibility. Sharp contrast, brightness and like characteristics can be obtained. The display element is also excellent in bistability, and assures a wide temperature compensation range.

Performance evaluation experiments in respect of the liquid crystal display elements were carried out and are described below together with comparative experiments.

In the following experimental examples, Y values (luminous reflectance) were evaluated with a spectrocolorimeter CM3700d having a white light source (product of Minolta Co., Ltd.). The contrast was evaluated by calculation: (Y value in a high light reflectance state/Y value in a low light reflectance state). In the following experimental examples, liquid crystal display elements were brought to a high light reflectance state when set to a incompletely planar state and were brought to a low light reflectance state when set to a focal conic state.

EXPERIMENTAL EXAMPLE 6

A nematic liquid crystal mixture (refractive index anisotropy 0.310, dielectric constant anisotropy 15.5, and isotropic phase transition temperature 108° C.) was mixed with 10.2 wt % of a chiral material represented by the formula C7, giving a chiral nematic liquid crystal composition showing a selective reflection wavelength of 700 nm. The obtained chiral nematic liquid crystal composition exhibited a cholesteric phase at room temperature and showed a refractive index anisotropy of 0.267, a dielectric constant anisotropy of 8.5, and an isotropic phase transition temperature of 85° C.

A silicon oxide film was formed as an insulating film on ITO electrodes formed over each of two glass substrates, and a functional film made of a polyimide resin as a main component was formed over the entire surface of each of the silicon oxide films. A sealing material XN21S (trade name, product of Mitsui Chemicals Co., Ltd.) was applied to a peripheral portion of one of the substrates to enclose said liquid crystal composition therewith. The two substrates were placed in opposed positions and a gap between the pair of substrates was adjusted to 5 $\mu$m by interposing the spacers between them in a manner to hold the liquid crystal composition therebetween. A black light absorbing layer was formed on an external surface of the substrate on other side than a side of incident light. In this way, a liquid crystal display element was produced. The obtained liquid crystal display element had substantially the same structure as the liquid crystal display element B' shown in FIG. 6 except that the insulating film was formed over the substrate on a side on which the black light absorbing layer was formed.

When a pulse voltage of 80 V was applied for 5 ms across the electrodes in the obtained liquid crystal display element, the display element was brought to an incompletely planar state (white state), and reflected light was obtained in the entire wavelength range of 480 nm to 700 nm. A Y value was 15.83 at that time. Further, when a pulse voltage of 50 V was applied for 5 ms across the electrodes in the liquid crystal display element, the display element was brought to a focal conic state (transparent state), and showed a Y value of 4.15. The contrast was 3.81.

EXPERIMENTAL EXAMPLE 7

A nematic liquid crystal mixture (refractive index anisotropy 0.282, dielectric constant anisotropy 15.9, and isotropic phase transition temperature 109° C.) was mixed with 25 wt % of a chiral material represented by the formula C3, giving a chiral nematic liquid crystal composition showing a selective reflection wavelength of 600 nm. The obtained chiral nematic liquid crystal composition exhibited a cholesteric phase at room temperature and showed a refractive index anisotropy of 0.217, a dielectric constant anisotropy of 13.5, and an isotropic phase transition temperature of 70° C.

A silicon oxide film was formed as an insulating film on ITO electrodes formed over each of two glass substrates, and a functional film made of a resin containing 15% of cholesterol skeleton as a main component was formed over the entire surface of each of the silicon oxide films. A sealing material XN21S (trade name, product of Mitsui Chemicals Co., Ltd.) was applied to a peripheral portion of one of the substrates to enclose said liquid crystal composition therewith. The two substrates were placed in opposed positions and a gap between the pair of substrates was adjusted to 10 $\mu$m by interposing the spacers between them in a manner to hold the liquid crystal composition therebetween. A black light absorbing layer was formed on an external surface of the substrate on other side than a side of incident light. In this way, a liquid crystal display element was produced. The obtained liquid crystal display element had substantially the same structure as the liquid crystal display element B' shown in FIG. 6 except that the insulating film was formed over the substrate on a side on which the black light absorbing layer was formed.

When a pulse voltage of 80 V was applied for 5 ms across the electrodes in the obtained liquid crystal display element, the display element was brought to an incompletely planar state (white state), and reflected light was obtained in the entire wavelength range of 480 nm to 700 nm. A Y value was 18.93 at that time. Further, when a pulse voltage of 45 V was applied for 5 ms across the electrodes in the liquid crystal display element, the display element was brought to a focal conic state (transparent state), and showed a Y value of 3.07. The contrast was 6.17.

EXPERIMENTAL EXAMPLE 8

A nematic liquid crystal mixture containing 58% of a liquid crystal cyanobiphenyl compound and 28% of a liquid crystal cyanoterphenyl compound (refractive index anisotropy 0.267, dielectric constant anisotropy 18, and isotropic phase transition temperature 96° C.) was mixed with 27.8 wt % of a chiral material represented by the formula C7, giving a chiral nematic liquid crystal composition showing a selective reflection wavelength of 520 nm. The obtained chiral nematic liquid crystal composition exhibited a cholesteric phase at room temperature and showed a refractive index anisotropy of 0.225, a dielectric constant anisotropy of 9.8, and an isotropic phase transition temperature of 65° C.

Two glass substrates having ITO electrodes are prepared. A silicon oxide film was formed as an insulating film on ITO electrodes formed over one of two glass substrates, and a functional film made of a polyimide resin as a main component was formed over the entire surface of the silicon oxide film. A sealing material XN21S (trade name, product of Mitsui Chemicals Co., Ltd.) was applied to a peripheral portion of one of the substrates to enclose said liquid crystal composition therewith. The foregoing glass substrate and the glass substrate having ITO electrodes alone formed thereon were placed in opposed positions and a gap between the pair of substrates was adjusted to 7 μm by interposing the spacers between them in a manner to hold the liquid crystal composition therebetween. A black light absorbing layer was formed on an external surface of the substrate on other side than a side of incident light. In this way, a liquid crystal display element was produced. The obtained liquid crystal display element had substantially the same structure as the liquid crystal display element B' shown in FIG. 6 except that the functional film and the silicon oxide film were not formed on the substrate on a side on which the black light absorbing layer was formed.

When a pulse voltage of 90 V was applied for 5 ms across the electrodes in the obtained liquid crystal display element, the display element was brought to an incompletely planar state (white state), and reflected light was obtained in the entire wavelength range of 480 nm to 700 nm. A Y value was 16.03 at that time. Further, when a pulse voltage of 60 V was applied for 5 ms across the electrodes in the liquid crystal display element, the display element was brought to a focal conic state (transparent state), and showed a Y value of 4.01. The contrast was 4.00.

EXPERIMENTAL EXAMPLE 9

A nematic liquid crystal mixture containing 100% of a liquid crystal cyanobiphenyl compound (cyanobiphenyl and tricyclic cyano compound) (refractive index anisotropy 0.241, dielectric constant anisotropy 26, and isotropic phase transition temperature 97° C.) was mixed with 30.6 wt % of a 3:2 mixture of chiral materials each represented by the formula C3 and the formula C7, respectively, giving a chiral nematic liquid crystal composition showing a selective reflection wavelength of 630 nm. The obtained chiral nematic liquid crystal composition exhibited a cholesteric phase at room temperature and showed a refractive index anisotropy of 0.208, a dielectric constant anisotropy of 10, and an isotropic phase transition temperature of 60° C.

A silicon oxide film was formed as an insulating film on ITO electrodes formed over each of two substrates made of polyether sulfone (PES), and a functional film made of a polyimide resin as a main component was formed over the entire surface of one of the substrates. A specified amount of spacers for controlling a gap of 10 μm between the two substrates was dispersed over the functional film on the substrate, and sealing material XN21S (trade name, product of Mitsui Chemicals Co., Ltd.) was printed by screen printing on a peripheral portion of the substrate in a manner to provide a continuous sealing wall. A functional film was formed of a resin containing 15% of a cholesterol skeleton as a main component on the entire surface of the insulating film over the other substrate.

Onto the functional film on the other substrate, an ink composition containing a thermoplastic resin as a main component was applied via a metal mask having perforations of about 100 μm in diameter spaced away from each other by about 500 μm, and was printed by screen printing with a squeegee, whereby pillar-like structures comprising cylinders of about 10 μin height were formed. Thereafter the liquid crystal composition previously prepared was applied. These two substrates were fixed together by a fixing device and were heated to 150° C. for 1 hour.

A black light absorbing layer was formed on the reverse surface (external surface) of the substrate on a side on which the pillar-like structures were arranged. Further, an UV protective filter (product of Nitto Denko Corp.) was provided on an external surface of the substrate on a side of incident light. In this way, a liquid crystal display element was produced. The obtained liquid crystal display element had substantially the same structure as the liquid crystal display element D' shown in FIG. 5(A) and FIG. 5(B) except that the insulating film was formed over the substrate on a side on which the black light absorbing layer was formed.

When a pulse voltage of 90 V was applied for 5 ms across the electrodes in the obtained liquid crystal display element, the display element was brought to an incompletely planar state (white state), and reflected light was obtained in the entire wavelength range of 480 nm to 700 nm. A Y value was 15.39 at that time. Further, when a pulse voltage of 60 V was applied for 5 ms across the electrodes in the liquid crystal display element, the display element was brought to a focal conic state (transparent state), and showed a Y value of 2.36. The contrast was 6.52.

EXPERIMENTAL EXAMPLE 10

A nematic liquid crystal mixture containing 60% of a liquid crystal cyanobiphenyl and 30% of a liquid crystal cyanoterphenyl compound (refractive index anisotropy 0.286, dielectric constant anisotropy 17.3, and isotropic phase transition temperature 113° C.) was mixed with 17.0 wt % of a 2:1 mixture of chiral materials each represented by the formula C3 and the formula C2, respectively, giving a chiral nematic liquid crystal composition showing a selective reflection wavelength of 600 nm. The obtained chiral nematic liquid crystal composition exhibited a cholesteric phase at room temperature and showed a refractive index anisotropy of 0.256, a dielectric constant anisotropy 13, and an isotropic phase transition temperature of 80° C.

This chiral nematic liquid crystal scarcely shifted selective reflection wavelength at a temperature ranging from room temperature to 60° C.

A silicon oxide film was formed as an insulating film on ITO electrodes formed over each of two substrates made of polyether sulfone (PES), and a functional film made of a silane coupling agent as a main component was formed over the entire surface of each of the silicon oxide films. A specified amount of spacers for controlling a gap of 9 μm between the two substrates was dispersed over one of the substrates, and a sealing material XN21S (trade name, product of Mitsui Chemicals Co., Ltd.) was printed by screen printing on a peripheral portion of the substrate in a manner to provide a continuous sealing wall. Onto the other substrate, an ink composition containing a thermoplastic resin as a main component was applied through a metal mask having perforations of about 100 μm in diameter spaced away from each other by about 500 μm, and was printed by screen printing with a squeegee, whereby pillar-like structures comprising cylinders of about 9 μm in height were formed. Thereafter the liquid crystal composition previously prepared was applied. These two substrates were fixed together by a fixing device and were heated to 150° C. for 1 hour.

A black light absorbing layer was formed on the reverse surface (external surface) of the substrate on a side on which the pillar-like structures were arranged. In this way, a liquid crystal display element was produced. The obtained liquid crystal display element had substantially the same structure as the liquid crystal display element D' shown in FIG. 5(A) and FIG. 5(B) except that an UV protective filter was not formed on the substrate on a side of incident light and the insulating film was formed over the substrate on a side on which the black light absorbing layer was formed.

When a pulse voltage of 85 V was applied for 5 ms across the electrodes in the obtained liquid crystal display element, the display element was brought to an incompletely planar state (white state), and reflected light was obtained in the entire wavelength range of 480 nm to 700 nm. A Y value was 20.01 at that time. Further, when a pulse voltage of 60 V was applied for 5 ms across the electrodes in the liquid crystal display element, the display element was brought to a focal conic state (transparent state), and showed a Y value of 2.76. The contrast was 7.25.

EXPERIMENTAL EXAMPLE 11

UV absorber MBT-175 (0.5 wt %, product of Nippon Kayaku Co., Ltd.) was added to the chiral nematic liquid crystal used in Experimental Example 10.

This chiral nematic liquid crystal scarcely showed shift of selective reflection wavelength at a temperature ranging from room temperature to 60° C.

A silicon oxide film was formed as an insulating film on ITO electrodes formed over each of two substrates made of polyether sulfone (PES), and a functional film made of a silane coupling agent as a main component was formed over the entire surface of each of the silicon oxide films. A specified amount of spacers for controlling a gap of 9 μm between the two substrates was dispersed over one of the substrates, and a sealing material XN21S (trade name, product of Mitsui Chemicals Co., Ltd.) was printed by screen printing on a peripheral portion of the substrate in a manner to form a continuous sealing wall. Onto the other substrate, an ink composition containing a thermoplastic resin as a main component was applied through a metal mask having perforations of about 100 μm in diameter spaced away from each other by about 500 μm, and was printed by screen printing with a squeegee, whereby pillar-like structures comprising cylinders of about 9 μm in height were formed. Thereafter the liquid crystal composition previously prepared was applied. These two substrates were fixed together by a fixing device and were heated to 150° C. for 1 hour.

A black light absorbing layer was formed on the reverse surface (external surface) of the substrate on a side on which the pillar-like structures were arranged. In this way, a liquid crystal display element was produced. The obtained liquid crystal display element had substantially the same structure as the liquid crystal display element D' shown in FIG. 5(A) and FIG. 5(B) except that an UV protective filter was not provided on the substrate on a side of incident light and that the insulating film was formed over the substrate on a side on which the black light absorbing layer was formed.

When a pulse voltage of 85 V was applied for 5 ms across the electrodes in the obtained liquid crystal display element, the display element was brought to an incompletely planar state (white state), and reflected light was obtained in the entire wavelength range of 480 nm to 700 nm. A Y value was 15.18 at that time. Further, when a pulse voltage of 60 V was applied for 5 ms across the electrodes in the liquid crystal display element, the display element was brought to a focal conic state (transparent state), and showed a Y value of 1.97. The contrast was 7.71.

In the reflection waveform, the peak of selective reflection were broad. The whiteness increased in image display, compared with the liquid crystal display element of Experimental Example 5. Scattering diminished on a short wavelength side, and image display became clear in a transparent state.

EXPERIMENTAL EXAMPLE 12

A nematic liquid crystal mixture (refractive index anisotropy 0.212, dielectric constant anisotropy 44, and isotropic phase transition temperature 103° C.) was mixed with 13.7 wt % of a 5:3 mixture of chiral materials each represented by the formula C3 and the formula C2, respectively, giving a chiral nematic liquid crystal composition showing a selective reflection wavelength of 600 nm. The obtained chiral nematic liquid crystal composition exhibited a cholesteric phase at room temperature and showed a refractive index anisotropy of 0.198, a dielectric constant anisotropy of 27, and an isotropic phase transition temperature of 85° C.

A silicon oxide film was formed as an insulating film on ITO electrodes formed over each of two glass substrates, and a functional film made of a polyimide resin as a main component was formed over the entire surface of each of the silicon oxide films. A sealing material XN21S (trade name, product of Mitsui Chemicals Co., Ltd.) was applied to a peripheral portion of one of the substrates to enclose said liquid crystal composition therewith. The two substrates were placed in opposed positions and a gap between the pair of substrates was adjusted to 9 μm by interposing the spacers between them in a manner to hold the liquid crystal composition therebetween. A black light absorbing layer was formed on an external surface of the substrate on other side than a side of incident light. In this way, a liquid crystal display element was produced. The obtained liquid crystal display element had substantially the same structure as the liquid crystal display element B' shown in FIG. 6 except that the insulating film was formed over the substrate on a side on which the black light absorbing layer was formed.

When a pulse voltage of 65 V was applied for 5 ms across the electrodes in the obtained liquid crystal display element, the display element was brought to an incompletely planar state (white state), and reflected light was obtained in the entire wavelength range of 480 nm to 700 nm. A Y value was 12.95 at that time. Further, when a pulse voltage of 50 V was applied for 5 ms across the electrodes in the liquid crystal display element, the display element was brought to a focal conic state (transparent state), and showed a Y value of 2.68. The contrast was 4.83.

COMPARATIVE EXPERIMENTAL EXAMPLE 4

A nematic liquid crystal mixture (refractive index anisotropy 0.123, dielectric constant anisotropy 8.2, and isotropic phase transition temperature 102° C.) was mixed with 32.2 wt % of a chiral material represented by the formula C3, giving a chiral nematic liquid crystal composition showing a selective reflection wavelength of 630 nm. The obtained chiral nematic liquid crystal composition exhibited a cholesteric phase at room temperature and showed a refractive index anisotropy of 0.128, a dielectric constant anisotropy 7.0, and an isotropic phase transition temperature of 70° C.

Two glass substrates having ITO electrodes were prepared. A silicon oxide film was formed as an insulating film on ITO electrodes formed over one of two glass substrates, and a functional film made of a polyimide resin as a main component was formed over the entire surface of the silicon oxide film. A sealing material XN21S (trade name, product of Mitsui Chemicals Co., Ltd.) was applied to a peripheral portion of one of the substrates to enclose said liquid crystal composition therewith. The foregoing substrate and the substrate having ITO electrodes alone formed thereon were placed in opposed positions and a gap between the pair of substrates was adjusted to 10 μm by interposing the spacers between them in a manner to hold the liquid crystal composition therebetween. A black light absorbing layer was formed on an external surface of the substrate on other side than a side of incident light. In this way, a liquid crystal display element was produced.

When a pulse voltage of 70 V was applied for 5 ms across the electrodes in the obtained liquid crystal display element, the display element was brought to an incompletely planar state (white state), and showed a Y value of 6.42. Further, when a pulse voltage of 50 V was applied for 5 ms across the electrodes in the liquid crystal display element, the display element was brought to a focal conic state (transparent state), and showed a Y value of 2.48. The contrast was 2.59, and the resulting display was dark and was low in contrast.

As stated above, in any of liquid crystal display elements of Experimental Examples 6 to 12, reflected light was obtained in the entire wavelength range of 480 nm to 700 nm. The resulting image display was bright and excellent in visibility and sharp contrast, brightness and like characteristics were obtained. On the other hand, the liquid crystal display element of Comparative Experimental Example 4 was such that the resulting display was dark and low in contrast.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal display element comprising:
   a pair of substrates; and
   a liquid crystal layer held between the pair of substrates, said liquid crystal layer containing a cholesteric liquid crystal that is substantially free of a polymer,
   wherein the liquid crystal display element is capable of switching the cholesteric liquid crystal to a colored state and to a scattering state by application of a voltage to provide image display, and
   wherein an integral value in a visible wavelength range of a formula $$\{exp-[2(\lambda-nP)^2/\Delta n^2 P^2]\}R$$

that is expressed as a function of wavelength $\lambda$ is in a range from about 40% to about 60% of an integral value in the visible wavelength range of a function $f(\lambda)$ that represents a spectral reflectance in the colored state, wherein n is an average refractive index of the cholesteric liquid crystal, P is a helical pitch of the cholesteric liquid crystal, R is a light reflectance in a selective reflection wavelength nP of the cholesteric liquid crystal in the colored state and $\Delta n$ is a refractive index anisotropy of the cholesteric liquid crystal.

2. The liquid crystal display element according to claim 1, wherein the selective reflection wavelength nP of the cholesteric liquid crystal is in a range of 500 nm to 800 nm.

3. The liquid crystal display element according to claim 1, wherein the refractive index anisotropy $\Delta n$ of the cholesteric liquid crystal is in a range of 0.18 to 0.32.

4. The liquid crystal display element according to claim 1, wherein the cholesteric liquid crystal has a temperature for transition to an isotropic phase in a range of 60° C. to 120° C.

5. The liquid crystal display element according to claim 1, wherein the liquid crystal layer contains a dye.

6. The liquid crystal display element according to claim 5, wherein the dye is an UV-absorbing dye.

7. The liquid crystal display element according to claim 5, wherein the dye has a maximum light absorption at around at least one of the selective reflection wavelength nP or 0.7 times of the selective reflection wavelength nP.

8. The liquid crystal display element according to claim 1, wherein the cholesteric liquid crystal is a chiral nematic liquid crystal prepared by adding at least one species of chiral materials to a nematic liquid crystal mixture.

9. The liquid crystal display element according to claim 8, wherein the chiral nematic liquid crystal contains the chiral material in a proportion of 10 wt % to 45 wt %.

10. The liquid crystal display element according to claim 8, wherein the nematic liquid crystal material contained in the chiral nematic liquid crystal has a refractive index anisotropy of 0.2 to 0.32.

11. The liquid crystal display element according to claim 1, wherein even after stopping the application of a voltage, a region of colored state and a region of scattering state are kept in the colored state and in the scattering state, respectively.

12. The liquid crystal display element according to claim 1, wherein in measured values of wavelength at which light reflectance reaches a peak in around selective reflection wavelength nP, there is a difference of not more than 30 nm between a measured value at a liquid crystal display element temperature of 25° C. and a measured value at a liquid crystal display element temperature of 60° C.

13. The liquid crystal display element according to claim 1, wherein a color filter is provided.

14. The liquid crystal display element according to claim 1, wherein a plurality of structures formed chiefly of a polymer material are arranged between the pair of the substrates.

15. The liquid crystal display element according to claim 1, wherein an UV protective filter is provided in any one of the paired substrates.

16. A liquid crystal display element which comprises a pair of opposed substrates and a liquid crystal layer containing a liquid crystal composition and held between the pair of opposed substrates, wherein at least one of the paired substrates has a functional surface in contact with the liquid crystal composition, the functional surface being capable of adjusting an orientated state of liquid crystal molecules in the liquid crystal composition close to the substrate and an orientated state of liquid crystal molecules in the liquid crystal composition remote from the substrate to make the former orientated state different from the latter, wherein the liquid crystal composition is a chiral nematic liquid crystal which comprises a nematic liquid crystal mixture having a refractive index anisotropy of 0.2 to 0.34 and at least one species of chiral materials added to the mixture, and exhibits a cholesteric phase at room temperature, and has a phase transition temperature of 60° C. or higher and a positive dielectric constant anisotropy, and wherein the wavelength range of selectively reflected light in the liquid crystal layer covers the entire range in a range of 480 nm to 700 nm.

17. The liquid crystal display element according to claim 16, wherein the liquid crystal composition has a selective reflection wavelength adjusted to a visible wavelength range.

18. The liquid crystal display element according to claim 17, wherein the selective reflection wavelength adjusted to a visible wavelength range is 550 nm to 650 nm.

19. The liquid crystal display element according to claim 17, wherein the selective reflection wavelength adjusted to a visible wavelength range is 580 nm to 620 nm.

20. The liquid crystal display element according to claim 16, wherein the chiral nematic liquid crystal has a dielectric constant anisotropy of 5 to 40.

21. The liquid crystal display element according to claim 16, wherein the chiral nematic liquid crystal has a dielectric constant anisotropy of 10 to 30.

22. The liquid crystal display element according to claim 16, wherein the nematic liquid crystal mixture has a refractive index anisotropy of 0.22 to 0.32.

23. The liquid crystal display element according to claim 16, wherein the nematic liquid crystal mixture contains 30 wt % or more of at least one of a liquid crystal cyanobiphenyl compound and a liquid crystal cyanoterphenyl compound.

24. The liquid crystal display element according to claim 23, wherein the nematic liquid crystal mixture contains the liquid crystal cyanobiphenyl compound in a larger proportion than the liquid crystal cyanoterphenyl compound.

25. The liquid crystal display element according to claim 16, wherein the chiral nematic liquid crystal contains the chiral material in a proportion of 10 wt % to 45 wt %.

26. The liquid crystal display element according to claim 16, wherein the chiral nematic liquid crystal contains two or more kinds of chiral materials.

27. The liquid crystal display element according to claim 16, wherein the chiral nematic liquid crystal has a refractive index anisotropy of 0.18 to 0.32.

28. The liquid crystal display element according to claim 16, wherein the chiral nematic liquid crystal has a phase transition temperature of 60° C. to 120° C.

29. The liquid crystal display element according to claim 16, wherein the chiral nematic liquid crystal contains at least one species of chiral materials having a CN group in the terminal.

30. The liquid crystal display element according to claim 16, wherein the chiral nematic liquid crystal contains a dye.

31. The liquid crystal display element according to claim 30, wherein the chiral nematic liquid crystal contains an UV-absorber.

32. The liquid crystal display element according to claim 16, wherein the functional surface contains a silicon atom or a siloxane skeleton.

33. The liquid crystal display element according to claim 16, wherein the functional surface contains a polyimide skeleton.

34. The liquid crystal display element according to claim 16, wherein the functional surface comprises an acrylate or polyimide compound.

35. The liquid crystal display element according to claim 16, wherein a plurality of structures made chiefly of a polymer material are provided between the pair of substrates.

36. The liquid crystal display element according to claim 16, wherein at least one of the paired substrates is provided with an UV protective filter.

* * * * *

UNITED STATES PATENT AND TRADEMARK OFFICE
CERTIFICATE OF CORRECTION

PATENT NO. : 6,618,103 B2
DATED : September 9, 2003
INVENTOR(S) : Akihito Hisamitsu et al.

It is certified that error appears in the above-identified patent and that said Letters Patent is hereby corrected as shown below:

Column 3,
Line 10, delete "foregoing", and insert -- following --.
Line 61, delete "inventor", and insert -- inventors --.

Column 9,
Line 47, delete "photolithography.optionally", and insert -- photolithography. Optionally --.

Column 10,
Line 37, delete "line a", and insert -- line $\underline{a}$ --.
Line 47, delete "state(line b", and insert -- sate (line $\underline{b}$ --.
Line 56, delete "c", and insert -- $\underline{c}$ --.
Line 59, delete "d", and insert -- $\underline{d}$ --.

Column 11,
Line 3, delete "waveform a, a line d", and insert -- waveform $\underline{a}$, a line $\underline{d}$ --.
Line 9, delete "waveform b, lines c and d", and insert -- waveform $\underline{b}$, lines $\underline{c}$ and $\underline{d}$ --.

Column 15,
Lines 65 and 66, delete "perora-tions", and insert -- perforations --.

Column 16,
Line 60, delete "a- silicone", and insert -- a silicone --.

Column 17,
Line 31, after "shown", delete "n", and insert -- in --.

Column 26,
Line 24, delete "followings", and insert -- following: --.

Column 30,
Line 66, delete "R1is", and insert -- R1 is --.

Column 33,
Line 10, delete "herical", and insert -- helical --.

Column 34,
Line 13, delete "T chl", and insert -- $T_{chl}$ --.

UNITED STATES PATENT AND TRADEMARK OFFICE
CERTIFICATE OF CORRECTION

PATENT NO. : 6,618,103 B2
DATED : September 9, 2003
INVENTOR(S) : Akihito Hisamitsu et al.

It is certified that error appears in the above-identified patent and that said Letters Patent is hereby corrected as shown below:

Column 39,
Line 62, delete "10$\mu$in", and insert -- 10$\mu$in in --.

Signed and Sealed this

Thirteenth Day of July, 2004

JON W. DUDAS
*Acting Director of the United States Patent and Trademark Office*